United States Patent
Lee et al.

(10) Patent No.: US 12,474,072 B2
(45) Date of Patent: Nov. 18, 2025

(54) MICROBIAL CONTROL ON HIGH-TOUCH SURFACES IN HEALTH CARE FACILITIES

(71) Applicant: Synexis LLC, Overland Park, KS (US)

(72) Inventors: James D. Lee, Prairie Village, KS (US); Douglas J. Bosma, Armonk, NY (US); James Russell Stephens, Kennesaw, GA (US)

(73) Assignee: Synexis LLC, Lenexa, KS (US)

( * ) Notice: Subject to any disclaimer, the term of this patent is extended or adjusted under 35 U.S.C. 154(b) by 722 days.

(21) Appl. No.: 17/569,263

(22) Filed: Jan. 5, 2022

(65) Prior Publication Data

US 2022/0221175 A1     Jul. 14, 2022

Related U.S. Application Data

(60) Provisional application No. 63/135,355, filed on Jan. 8, 2021.

(51) Int. Cl.
   *F24F 8/24*     (2021.01)
   *F24F 3/167*    (2021.01)
   *F24F 8/90*     (2021.01)

(52) U.S. Cl.
   CPC ............... *F24F 8/24* (2021.01); *F24F 3/167* (2021.01); *F24F 8/90* (2021.01)

(58) Field of Classification Search
   CPC ........ A61L 2/208; A61L 2202/25; F24F 8/24; F24F 8/22
   See application file for complete search history.

(56) References Cited

U.S. PATENT DOCUMENTS

| | | | |
|---|---|---|---|
| 7,988,923 B2 | 8/2011 | Fink et al. | |
| 8,012,412 B2 | 9/2011 | Normark et al. | |
| 8,877,046 B2 | 11/2014 | Ellis | |
| 9,283,295 B2 | 3/2016 | Fink et al. | |
| 9,295,746 B2 | 3/2016 | Ellis | |
| 9,433,691 B2 | 9/2016 | Eide et al. | |
| 9,839,901 B2 | 12/2017 | Ellis et al. | |
| 2009/0041617 A1* | 2/2009 | Lee .................... | A61L 2/208 422/4 |
| 2011/0182772 A1* | 7/2011 | Holt .................... | A61L 2/208 422/186 |
| 2011/0182773 A1 | 7/2011 | Holt | |
| 2011/0183598 A1 | 7/2011 | Holt | |
| 2015/0205985 A1* | 7/2015 | Jinadatha ............. | G16H 40/20 340/10.4 |
| 2018/0280558 A1* | 10/2018 | Mount ................. | A61L 9/14 |

(Continued)

FOREIGN PATENT DOCUMENTS

| CN | 109589441 A1 | 4/2019 |
| IT | UA20 163 437 A1 | 11/2017 |
| WO | 2017/028911 A1 | 2/2017 |

OTHER PUBLICATIONS

International Search Report received in international application No. PCT/US2022/011320, mailed May 16, 2022.

*Primary Examiner* — Donald R Spamer
*Assistant Examiner* — Kayla Rose Sarantakos
(74) *Attorney, Agent, or Firm* — Hovey Williams LLP

(57) ABSTRACT

Improved methods for reducing and preventing nosocomial infections is provide comprising installing one or more dry hydrogen peroxide (DHP) generating devices into a healthcare treatment area, producing DHP, and maintaining the concentration between 1.0 parts-per-billion (ppb) and 200 ppb.

27 Claims, 3 Drawing Sheets

(56) References Cited

U.S. PATENT DOCUMENTS

2020/0368713 A1 11/2020 Holt
2021/0038755 A1 2/2021 Eide
2021/0228762 A1 7/2021 Eide et al.
2021/0346565 A1 11/2021 Woodbridge

* cited by examiner

# MICROBIAL CONTROL ON HIGH-TOUCH SURFACES IN HEALTH CARE FACILITIES

CROSS-REFERENCE TO RELATED APPLICATIONS

This application claims priority from U.S. Provisional Patent Application Ser. No. 63/135,355, filed Jan. 8, 2021.

FIELD OF THE INVENTION

The present disclosure relates methods to provide continuous microbial, insecticidal, and odor control in dynamic environments such as functioning hospital wards and the application of the methods to reducing contamination of high touch surfaces and reducing nosocomial infection rates.

BACKGROUND OF THE INVENTION

A number U.S. patents and devices and methods describe the preparation of Dry Hydrogen Peroxide (DHP), also described as Purified Hydrogen Peroxide Gas (PHPG) gas, using a photocatalytic reaction system. A device for the preparation of DHP was first described in United States Patent Publication No. US 2009/0041617 published Feb. 12, 2009 ("the '617 Publication"). DHP is a non-hydrated gas of hydrogen peroxide having the chemical formula $H_2O_2$. As a true gas, DHP behaves as an essentially ideal gas at standard temperatures and pressures. Like the nitrogen, oxygen, and water in the air, DHP gas diffuses freely throughout the environment, limited only by its reactivity. Unlike gases like nitrogen or carbon dioxide, DHP cannot be compressed and stored for later use due to its high reactivity. DHP gas must be generated in situ, continuously, and maintained at an effective concentration. In laboratory testing, DHP has demonstrated potent disinfection activity against a variety of bacteria, fungi, and viruses in the air and on glass and metal surfaces.

A central element of devices capable of producing measurable amounts of ozone-free DHP is an air permeable mesh coated with the photocatalyst titanium dioxide ($TiO_2$). In a DHP generating device, a "sail" is illuminated by a blacklight (a UVA lamp, 315 to 400 nm) which drives a photocatalytic reaction of water and oxygen to produce DHP gas. See International Patent Application No. PCT/US2015/029276.

DHP gas has very different properties from vaporized hydrogen peroxide (VHP) prepared from hydrogen peroxide solutions. Vaporized or evaporated forms of hydrogen peroxide are hydrated and do not behave as a near ideal gas. Critically, vaporized or evaporated forms are present at concentrations that are thousands to millions of time greater than DHP.

The photocatalytic production of DHP is accomplished using a flow of ambient air through an air permeable catalyst coated mesh, hereinafter called a "sail." Under operation, the absorption of photons at certain catalyst defined wavelengths generates a reactive ionized region called a "plasma" at the catalyst's surface. Plasmas consist of positive ions and free electrons as well as hydroxyl radicals, hydroxyl ions, superoxides, ozone ions, hydrogen peroxide and hydrogen ions. These components are prepared in situ on the surface of the illuminated catalyst from the oxygen and water present in ambient air. By flowing ambient air through the air permeable substrate, components of the plasma are removed and directed away from the catalytic surface. Thus the flow of air removes the reactive species before they can be consumed. By configuring the reactor morphology as a thin, sail-like air-permeable structure, just inside the diffuser's interior shell, the exit path length for hydrogen peroxide molecules produced on the catalyst becomes very short, and their residence time within the reactor structure is reduced to a fraction of a second, preventing the vast majority of hydrogen peroxide molecules from being subsequently adsorbed onto the catalyst and reduced back into water. Away from the device, nearly all of the reactive species are consumed or degraded, leaving the relatively stable hydrogen peroxide to persist and accumulate in the area outside the device. DHP generating devices are designed to prepare hydrogen peroxide gas and direct it outside of the device and into the surrounding environment. DHP gas diffuses and mixes freely in a space. As DHP is highly reactive, as it mixes and diffuses, it is degraded, thus the area of any single source of DHP is limited.

DHP generating devices and methods of using DHP are described in a series of patent publications. International Patent Application No. PCT/US2014/038652, published as International Patent Publication No. WO 2014/186805, discloses the effectiveness and use of DHP for the control of arthropods, including insects and arachnids. International Patent Application No. PCT/US2014/051914, published Feb. 26, 2015, as International Patent Publication No. WO2015/026958, discloses the beneficial effects of DHP on respiratory health, including increased resistance to respiratory infection and increased hypothiocyanate ions in mammalian lungs. International Patent Application No. PCT/US2015/029276, published Nov. 12, 2015, as International Patent Publication No. WO 2015/171633, discloses improvements to DHP generating devices including improved sails and catalysts. International Patent Application No. PCT/US2016/028457, published Oct. 27, 2016, as International Patent Publication No. WO 2016/172223, discloses an application of DHP to clean rooms. International Patent Application No. PCT/US2016/029847, published Nov. 3, 2016, as International Patent Publication No. WO 2016/176486, discloses methods of use of DHP in agricultural production, transport, and storage. International Patent Application No. PCT/US2018/012984, published as International Patent Publication No. WO 2018/129537 on Jul. 12, 2018, discloses the application of DHP to poultry production. The contents of each of the foregoing applications are incorporated herein by reference in their entireties.

The earlier filings document the achievement of various effects in controlled, laboratory environments. Specific capabilities include the reduction of microbial contamination levels for viruses, bacteria, and fungi; the reduction of Volatile Organic Compound (VOC) levels; and control of insects and arachnids (either by killing them, or by driving them out of the protected area).

The '617 Publication first demonstrated the production of DHP using a photocatalytic device and demonstrated its effectiveness on the growth and survival of Feline Calicivirus, Methicillin-resistant *Staphylococcus aureus* (MRSA), vancomycin-resistant enterococcus (VRE), *Clostridium difficile*, and *Aspergillus niger* that had been applied as cultures to steel and glass coupons and exposed to DHP. While effective, under controlled conditions on clean dry surfaces, the studies do not address the activity of DHP when applied to "real world" conditions or dynamic environments.

To date, there are only a few reports regarding the effectiveness of DHP outside of the controlled laboratory environment none of which address the difficulties in maintaining DHP in a dynamic, active environment. In contrast to a controlled environment, the "real world" imposes a variety of limitations and challenges. First, the target microbes would comprise different strains of microbes and present as complex, interacting, populations. Differing levels of cleanliness further complicate surfaces on which the microbes reside and vary widely with regards to dirt, growth resources (e.g., sugars and food), residual chemicals (e.g., cleaning compounds) can select for resistant organisms or interfere with the production and maintenance of DHP. The complex ecosystems result in different levels of bioburden on target surfaces that often require different disinfection approaches. While some surfaces resemble the sterile, non-porous steel and glass test surfaces, real world microbial populations populate porous surfaces including fabrics. Moreover, microbes on certain surfaces microbes can form "biofilms" that are refractory to cleaning and disinfection. See Yang et al., "Combating biofilms," FEMS Immunol Med Microbiol. 65(2):146-57 (2012) and Peterson et al. "Viscoelasticity of biofilms and their recalcitrance to mechanical and chemical challenges," FEMS Microbiol Rev. 39(2):234-45 (2015). These materials and differences confound the effectiveness of disinfectants generally and such concerns apply to DHP. As discussed below for other disinfection technologies, even where very high kill rates (6 log or greater) are observed under test conditions, effectiveness in the real world is not predictable. Disinfection technologies are regulated under the EPA and for medical related applications by the FDA related to disinfection claims and claims related to human health respectively.

It is estimated that Hospital-Acquired Infections (HAIs) cost United States hospitals over $30 billion annually. HAIs are extremely common among hospitalized patients and patients admitted to long-term care institutes such as nursing homes and skilled nursing facilities. Hospital-acquired infections are a growing problem around the world. With emergence of an increasing number of antibiotic-resistant bacterial strains, including VRA and MRSA, the threat of HAIs has reach alarming significance. The Centers for Disease Control (CDC) estimates that 1.7 million hospital-acquired infections occur per year, responsible for 99,000 deaths. The cost of HAIs to US hospitals alone is estimated to exceed $30 billion dollars per year and $15,275 per infection in direct patient care cost to the hospital (see, www(dot)cdc(dot)gov/HAI/pdfs/hai/Scott_CostPaper.pdf).

It has become clear that existing measures of disinfection in the hospital are inadequate. This has led to the development of new methods of disinfection, including ultraviolet light disinfection, vaporized hydrogen peroxide (VHP) systems, and chemical treatments. Recent research suggests that decreasing the bioburden may reduce HAI risk. Rutala and Weber, "Best practices for disinfection of noncritical environmental surfaces and equipment in health care facilities: A bundle approach," *Am J Infect Control* 47:A96-A105 (2019), Hayden et al., "Reduction in acquisition of Vancomycin-resistant *Enterococcus* after enforcement of routine environmental cleaning measures," *Clin Infect Dis.* 42(11): 1552-1560 (2006); Denton et al., "Role of environmental cleaning in controlling an outbreak of *Acinetobacter baumannii* on a neurosurgical intensive care unit," *J Hosp Infect.* 56(2):106-110 (2004), Grabsch et al., "Significant reduction in vancomycin-resistant *enterococcus* colonization and bacteraemia after introduction of a bleach-based cleaning—disinfection programme," *J Hosp Infect.* 82(4): 234-242 (2012), Rampling et al., "Evidence that hospital hygiene is important in the control of methicillin-resistant *Staphylococcus aureus*," *J Hosp Infect.* 49(2):109-116 (2001), Wilson et al., "The impact of enhanced cleaning within the intensive care unit on contamination of the near-patient environment with hospital pathogens: a randomized crossover study in critical care units in two hospitals," *Crit Care Med.* 39(4):651-658 (2011), and Eckstein et al., "Reduction of *Clostridium difficile* and Vancomycin-resistant *Enterococcus* contamination of environmental surfaces after an intervention to improve cleaning methods," *BMC Infect Dis.* 7:61 (2007). Further, it is recognized that infection risk is multifactorial and it is challenging to isolate a single intervention, such as surface bioburden reduction, as the sole causative factor in HAI reduction when other factors such as hand hygiene compliance, instrument sterilization, aseptic technique, etc may also have played a role. See Sullivan et al., "Cleaning Hospital Room Surfaces to Prevent Health Care—Associated Infections: A Technical Brief," *Annals of Internal Medicine* 163:598-607 (2015)

Aqueous hydrogen peroxide is already well known in both liquid and vapor forms and has been used extensively for many years in healthcare. Microbes are susceptible to hydrogen peroxide because they require water from the environment and have electro-statically configured points on their cells designed to attract water molecules from the environment. Hydrogen peroxide molecules are similar to water molecules in structure and are also attracted to these points. Unfortunately, when mixed with water, hydrogen peroxide molecules must compete with water molecules to access these points, and higher concentrations of hydrogen peroxide are required to demonstrate efficacy when mixed with water. By contrast, DHP achieves efficacy using low concentrations of hydrogen peroxide because it is not mixed with water nor is hydrated.

There is a clear need for innovative strategies to improve our HAI rates to add to our current back to basics initiatives in the hopes of achieving higher success with our prevention initiatives in decreasing life threatening HAIs in patients.

In view of the costs and suffering, microbial reduction in the health care setting is an ongoing concern and the technologies for the reduction of microbes in occupied spaces is diverse. Among them are vaporized hydrogen peroxide alone or combined with periacetic acid, ultraviolet (UV) light, chemical disinfectants such as sodium hypochlorite, and enhanced manual cleaning. Other efforts incorporate biocidal surfaces having, for example copper. See Rivero et al., "Impact of copper in the reduction of hospital-acquired infections, mortality and antimicrobial costs in the Adult Intensive Care Unit," *Rev Chilena Infectol.* 31(3): 274-9 (2014); Sifri et al, "Reduced healthcare-associated infections in an acute care community hospital using a combination of self-disinfecting copper-impregnated composite hard surfaces and linens," *Am J Infect Control* 44(12): 565-71 (2016); Humphreys, "Self-disinfecting and Microbiocide-Impregnated Surfaces and Fabrics: What Potential in Interrupting the Spread of Healthcare-Associated Infection?" *Clin Infect Dis.* 58(6): 848-853 (2014); Montero et al., "Antimicrobial properties of a novel copper-based composite coating with potential for use in healthcare facilities," *Antimicrob Resist Infect Control.* 8:3 (2019).

McDonald and Arduino report that increasing attention is being paid to high touch surfaces in health care settings, with particular concern directed to the multi-drug resistant bacteria. High touch surfaces are those surfaces that are defined by frequency of contact by health care personnel. See Huslage et al., "A Quantitative Approach to Defining High-Touch Surfaces in Hospitals," *Infect Control Hosp Epidemiol.* 31:850-853 (2010) and Huslage et al., "Microbial assessment of high-, medium-, and low-touch hospital room surfaces," *Infect Control Hosp Epidemiol.* 34(2):211-2 (2013). For indirect transmission of a pathogen, the high touch surface serves as the common intermediate step that can be targeted to reduce transmission.

Evaluating the effectiveness of disinfection technologies can be a difficult task confounded by factors including hand hygiene, isolation, device, antibiotic use, patient populations, public access, and small population number. Moreover, the success of the sum efforts to reduce infection, particularly in health care settings, make improvements even more difficult to demonstrate. See e.g., McDonald and Arduino, "Climbing the evidentiary hierarchy for environmental infection control," *Clin Infect Dis.* 56:36e39 (2013).

Vaporized Hydrogen Peroxide (VHP) as a disinfectant in health care settings has obtained mixed reviews. While VHP is capable of rapid and essentially complete killing of microbes (e.g., six log killing), in addition to toxicity, it has been reported by many as providing incomplete protection from pathogens such as VRE, MRSA, of multidrug resistant gram-negative bacteria (MDR GNB), and *C. difficile*. Toxicity of VHP requires that rooms be evacuated before decontamination. Further prep includes sealing doors and gaps and disabling the heating ventilation and air conditioning (HVAC) system to prevent unwanted dilution of VHP during use. In addition, the results are sensitive to use parameters such as the concentration of the stock hydrogen peroxide solutions. Accordingly, VHP decontamination can be accomplished only as a terminal disinfection (i.e., cannot be used for daily disinfection). Following treatment, decontamination can require 3 to 5 hours, all time that the space cannot be occupied. Finally substantial capital equipment costs, supply costs, and labor make VHP approaches less attractive. Rutala and Weber report numerous shortcomings of VHP and UV-C systems. See Rutala and Weber, "Are room decontamination units needed to prevent transmission of environmental pathogens?" *Infect Control Hosp Epidemiol.* 32:743e747 (2011).

Despite considerable success, VHP treatments are incompletely effective thus limiting their applicability to routine disinfection. McDonald and Arduino report a prospective cohort intervention study evaluating the impact of VHP decontamination on environmental contamination and MDRO acquisition compared with standard cleaning protocols. Finding both to be reduced, the authors noted that "[s]urprisingly, 13.9% of rooms were still contaminated after [VHP] decontamination (i.e., Table 5 in the report by Passaretti et al), despite the remarkable efficacy of [VHP] decontamination." McDonald and Arduino, "Climbing the evidentiary hierarchy for environmental infection control," *Clin Infect Dis.* 56:36e39 (2013).

Even where VHP treatment is successful, the environment quickly becomes contaminated. Passaretti et al. show that recontamination after VHP treatment occurs quickly. See Passaretti et al., "An evaluation of environmental decontamination with hydrogen peroxide vapor for reducing the risk of patient acquisition of multidrug resistant organisms," *Clin Infect Dis.* 56:27-35 (2013). Hardy et al. report that even effective decontamination methods such as VHP are subject to rapid recontamination—within 24 hrs hours—with total bacterial counts reaching pre-VHP levels by one week. Hardy et al. conclude that "[VHP] is not effective in controlling the environmental levels of either MRSA or total bacterial counts once patients are readmitted to an open-plan ward." Hardy et al., "Rapid recontamination with MRSA of the environment of an intensive care unit after decontamination with hydrogen peroxide vapour," *J Hosp Infect.* 66:360 (2007).

Fogging systems utilizing hydrogen peroxide and peracetic acid are effective in reducing and eliminating *C. difficile* spores, MRSA, and vancomycin-resistant *Enterococcus* on carriers placed in multiple sites throughout hospital rooms with the exception of in partially-opened drawers. Mana et al., "Evaluation of an automated room decontamination device using aerosolized peracetic acid," *Am J Infect Control* 45: 327-9 (2017). Like VHP methods generally, disadvantages of the fogging system include the cost of the solutions, preparations to seal vents and doors to prevent leakage of the fog. Further, because peracetic acid and hydrogen peroxide can cause serious eye, skin, and respiratory tract irritation, precautions to ensure the safety of personnel are required. The corrosive nature of peracetica acid and VHP further limits is usefulness.

Ultraviolet light, specifically UV light in the UV-C wavelengths (290 nm-100 nm) has shown some promise in decontaminating rooms and reducing nosocomial infections. Like VHP approaches, UV-C light disinfection requires that all patients and staff be removed from the room. Thus UV-C can only be used for terminal disinfection. See Rutala and Weber. Further, UV-C treatment may require rearrangement of furniture and equipment and the effectiveness depends on the distance of the objects from the UV-C source. See Cadnum et al., "Effect of variation in test methods on performance of ultraviolet-C radiation room decontamination," *Infect Control Hosp Epidemiol.* 37:555-60 (2016). See also Nerandzic et al., "Sorting through the wealth of options: comparative evaluation of two ultraviolet disinfection systems," *PLoS One* 23(9):e107444 (2014); Nerandzic et al., "Evaluation of an automated ultraviolet radiation device for decontamination of *Clostridium difficile* and other healthcare-associated pathogens in hospital rooms," *BMC Infect Dis.* 10:197 (2010).

Others report that appropriate manual application of chemical disinfectants results in reductions equivalent to those achieved with VHP. For example, Po and Carling report that 5,500 ppm sodium hypochlorite applied to commonly-touched environmental surfaces in the rooms of patients with *C. difficile* infection resulted in an overall reduction rate of 97% in environmental contamination, compared with an average of 89% in 3 VHP studies. See Po and Carling, "The need for additional investigation of room decontamination processes," *Infect Control Hosp Epidemiol.* 31:776 (2010). A cohort study evaluating the efficacy of manual terminal cleaning and VHP terminal cleaning in removing *C. difficile* reveals similar deficiencies. Yui et al. report that while VHP reduces contamination by *C. difficile*, reduction was not complete with 4.4% of surfaces remaining positive after VHP use. See Yui et al., "Identification of *Clostridium difficile* reservoirs in the patient environment and efficacy of aerial hydrogen peroxide decontamination," *Infect Control Hosp Epidemiol.* 38:1487-92 (2017).

Chemical disinfectants such as sodium hypochlorite are as effective as UV-C based approaches but are often toxic and corrosive. Further, proper application by staff is critical to successful use. See Nerandzic et al., (2010) and Nerandzic et al., (2014).

Manual cleaning efforts suffer from compliance and oversight issues and even after the implementation of intervention programs where not more than 85% of the objects are adequately cleaned. See Rutala and Weber.

HAIs are extremely common among hospitalized patients and patients admitted to long-term care institutes such as nursing homes and skilled nursing facilities. Reducing HAI infections represents a long felt and unmet need, in most setting and particularly in long term settings. Preventing HAIs in critical healthcare environment that are supposed to have a home-like environment, such required by Veterans Administration and other regulations is particularly difficult. Implementing typical infection prevention and control measures such as contract precautions are hard when the message is conflicting between infection prevention and home like environment both for healthcare providers and patients alike. There has been a lack of historical improvement in HAI rates despite improved hand hygiene compliance and strict isolation precautions. Daily disinfection using hospital approved disinfectants is not possible due to limited personnel and resources in such settings. Automated solutions that might help keep bioburden low thus preventing HAI have the potential to solve a huge unmet need in long term settings. The application of DHP, a continuous method for reducing microbial loads offers a solution to the infection that affects one out of ten hospitalized patients.

SUMMARY OF THE INVENTION

The present disclosure comprises, in one form thereof, a method for establishing a DHP containing environment for microbial reduction comprising installing at least one catalytic sail Dry Hydrogen Peroxide (DHP) generating device having a fresh, unused catalytic sail in an environment for microbial reduction, operating the DHP generating device(s) to produce and distribute DHP, providing a conditioning time for conditioning the treatment environment with DHP and monitoring VOC and DHP concentrations, replacing the catalytic sail and establishing a DHP concentration of at least 5.0 ppb in the treatment area maintaining DHP at a concentration of at least 5.0 parts per billion (ppb) up to 40 ppb for at least one week.

In another form, the present disclosure includes a method for reducing nosocomial infections in a healthcare treatment area in need thereof comprising continuously operating one or more DHP generative devices in a treatment area in need thereof, establishing an average DHP concentration of at least 5.0 ppb and distributed throughout at least 90% of the volume of said treatment area, maintaining DHP at an average concentration of at least 5.0 parts per billion up to 40 ppb for at least one week; and reducing pathogenic bacteria in said healthcare facility.

In an aspect, the present disclosure provides for, and includes, methods for reducing multidrug-resistant organisms (MDROs) on surfaces in a healthcare treatment area comprising continuously operating one or more Dry Hydrogen Peroxide (DHP) generating devices to produce and distribute DHP in said treatment area, establishing a DHP concentration of at least 5.0 ppb and distributed within said treatment area, maintaining DHP at a concentration of at least 5.0 ppb for at least one week; and reducing multidrug-resistant organisms (MDROs) in said healthcare facility by at least 70%, and maintaining said reduced levels for at least 30 days.

In an aspect, the present disclosure includes, and provide, for methods for reducing the spread of infection in an acute infectious outbreak in a healthcare treatment area in need thereof comprising, identifying a treatment area having an acute infection outbreak, providing one or more Dry Hydrogen Peroxide (DHP) generating devices to produce and distribute DHP in the treatment area, establishing a DHP concentration of at least 20 ppb, maintaining DHP at a concentration of at least 20 ppb until the acute infectious outbreak is controlled.

BRIEF DESCRIPTION OF THE DRAWINGS

The present disclosure is disclosed with reference to the accompanying drawings, wherein.

Corresponding reference characters indicate corresponding parts throughout the several views. The example(s) set out herein illustrate(s) embodiment(s) of the present disclosure but should not be construed as limiting the scope of the present disclosure in any manner.

DETAILED DESCRIPTION

Figure 1:
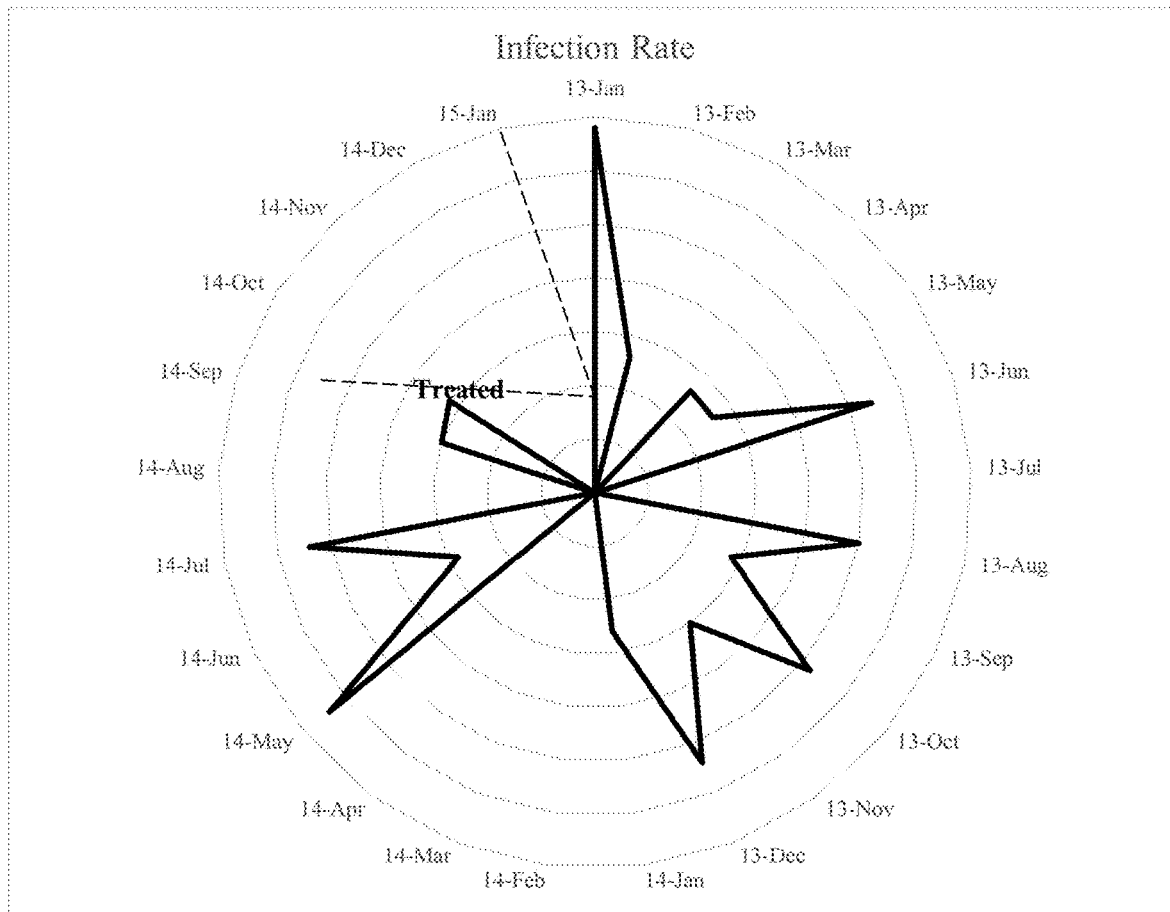
FIG. 1 is a plot of infection rates in a hospital study showing a reduction in the number and frequency of HAI infections during the study period.

The present disclosure provides for, and includes, methods for the provision of DHP to complex environments, particularly healthcare facilities. Such environments pose unique difficulties that must be overcome to apply the promising DHP technology to the reduction of infection, morbidity, and mortality.

Applying DHP technology in health care settings poses unique challenges. Among the Factors that impact the effectiveness of DHP in such environments include:
  Safety constraints limiting DHP usage in spaces occupied by patients and healthcare staff;
  Size challenges as some healthcare treatment areas can comprise a hospital ward of tens of thousands of square feet in area;
  Compartmentalization as hospital wards are often divided into many smaller spaces served by a common air handling system;
  Recirculation: air is recirculated through filtration systems which destroy significant amounts of DHP;
  Line loses: long sections of duct can cause losses of DHP on their interior surfaces;
  Occupation: each person of the dozens of person in the treatment area consumes DHP from up to 30 liters of air per minute through respiration;
  Equipment and furnishings: equipment and furnishings increase surface areas for DHP reaction and disrupt air flow within the space;
  Decomposition: DHP is decomposed upon contact with any surface, including furniture, instruments, curtains, and the many other items present throughout a ward.
  Reaction: DHP reacts with, and must overcome, VOCs evolved from materials in the environment and from medications, cleaning fluids, salves, and medical gasses in use throughout the ward including:
    Accumulated VOCs: VOCs that have accumulated over time and remain in the environment.
    Evolving VOCs: VOCs evolved daily from standard activities, To be effective in an active and dynamic occupied hospital hosting hundreds of patients, visitors, and staff it is necessary to meet several planning conditions. It is not sufficient to simply install a DHP generating device or even multiple devices. Rather, whether in a large hospital or a smaller facility, the space is divided into multiple discrete, isolated subsections, or treatment areas. As used herein, a treatment area is defined as an area serviced by a single air handler, where all space within the discrete environment receives supply air from its dedicated single air handler, and all air recycled from that space is returned to that same air handler. Treatment area within a single air handler zone is often further subdivide by rooms, walls and other barriers and these features must be accounted for when designing the system and placing DHP generating devices and generally require higher densities of DHP sources.

In some aspects, the treatment area may be further sub-divided, and a sub-area treated, however this configuration is not optimal. For example, if only 50% of the discrete subsection is supplied with DHP, the available concentration of DHP in that subsection will be diluted during recirculation by untreated air from the areas of the subsection not supplied with DHP, resulting in lowered effectiveness. Such configurations can be useful however to control discrete outbreaks and for short term high concentration DHP remediation. Similarly, such configurations are useful during acute infectious outbreaks.

To achieve the desired treatment environment, the treatment area is first analyzed to determine how many DHP generators are required to provide DHP to the entire environment, using an average baseline calculation of one DHP generator per 1400 square feet, but allowing for up to one generator per 1200 square feet or as little as one generator per 2000 square feet.

In an aspect, DHP generators are deployed into the environment affixed to, and incorporated within the HVAC system, and evenly distributed in a manner that provides multiple point sources of DHP with overlapping areas of effect. While HVAC system installations take advantage of existing ventilation engineering, similar results can be achieved through the use of stand alone DHP generating systems.

Both prior to, and after a system is installed, the treatment area is further examined to identify stagnant zones and hot spots. Stagnant zones and hot spots can arise under a variety of circumstances.

a. Compartmentalization: Lesser or greater numbers of compartmentalized spaces can inhibit the diffusion of DHP into neighboring spaces resulting in both hotspots and stagnant zones (DHP discontinuities). In most cases, hotspots are of little concern, however they may reflect the existence of a stagnant zone. Stagnant zones can be serviced by supplemental stand-alone DHP generators or the installation additional HVAC units. In some aspects, a hot spot and stagnant zone are linked and can be adjusted by increasing the flow between the spaces, by providing additional venting, or removing furniture or equipment.

b. Reaction burden: Lesser or greater VOC loads from sources in the treatment area such as off-gassing materials; heavy use of ointments, salves, etc.; or heavy use of volatile solvents, etc. react with and reduce the levels of DHP. For efficiency, such burdens can be removed. In some aspects, additional DHP generators may be required.

c. Equipment and furnishings burden: Lesser or greater amounts of cluttered spaces containing greater than usual amounts of furniture, equipment, and stored items.

d. Occupation burden: Less or more heavily populated areas hosting fewer or larger than average numbers of patients, medical staff, and visitors who consume DHP through respiration while in the space.

e. Volumes: DHP device needs are generally calculated by area, accordingly adjustments for ceilings lower than or higher than a baseline of 8 feet, decrease or increase the volume of space that should be protected.

The number of devices necessary to establish an average DHP concentration of at least 5.0 ppb in a treatment area is determined by a number of factors. In general, using the devices described above, a single device is generally sufficient to provide coverage to a 1,400 square foot area having nine (9) foot ceilings (about 130 meters$^3$). However, this ratio of devices to volume only provides a guide achieving the desired DHP concentration. A variety of factors affect steady state DHP levels in the real world. First, many facilities have heating, ventilation, and air conditioning systems that draw fresh air as well as recirculate air through the system. Both recirculation and fresh air reduce the steady state levels of DHP.

One possible solution to establishing a desired concentration of DHP in a treatment area is to provide extra capacity in the form of additional units. While this approach can increase DHP levels, it does not address distribution issues. Generally, it is preferred to introduce DHP producing devices into heating ventilation and air conditioning (HVAC) systems as they are already engineered to supply conditioned air throughout a zone. However, even the best designed HVAC systems necessarily provide uneven distribution of conditioned air. Dead zones or DHP deficient zones form in corners and areas that are not directly served with a source vent and return vent. Air flows tend to flow from the source to the return, essentially along the path of least resistance. Further, the placement of barriers to air flow create dead zones (DHP deficient zones) as well. Examples of barriers include furniture and equipment present in most treatment areas. Temporary barriers can also be an issue, for example privacy curtains which inhibit the free flow of air. Importantly, in addition to reducing the access and distribution of DHP, the barriers serve as significant reservoirs of microbes, including pathogenic organisms.

Current HVAC systems are not designed with the distribution of DHP in mind, thus they necessarily have zones that will be DHP deficient and that cannot be remedied by increasing flow rates. First, there is a limit to the flow that can be achieved and still maintain the conditioned space within its design parameters (temperature, humidity, etc). Second, as most HVAC systems incorporate one or more filters, passage of DHP conditioned air through the filters results in reaction and destruction of the DHP. Importantly, when installing DHP devices into an HVAC system, the devices should be placed downstream of any filtration systems in order to ensure that DHP is provided to the occupied spaces. In some aspects, additional DHP generating devices may be installed within the air handling system itself to reduce microbial loads in the ducts and vents. Such an arrangement can be particularly beneficial in older hospitals that may have contaminated air systems, such as by Legionnaire's disease. In some aspects, DHP generating devices may be placed upstream of HVAC filters to reduce filter trapped microbes however the amounts of DHP downstream of such treated filters will be greatly reduced and provide negligible contributions to the equilibrium DHP concentration in occupied spaces. Finally, additional DHP devices may be installed in the air return plenums (usually upstream of filtration) to reduce microbial contamination within the ducts. Older hospitals and buildings can benefit significantly from these additional installations but such installations do not contribute to the overall DHP levels in the occupied spaces. While installation of DHP devices in the both source and return ducts of an HVAC, only DHP devices placed downstream of filters and arranged to minimize line loses will contribute to the accumulation of DHP in the occupied spaces. Similarly, as an active catalytic sail of a DHP generating device degrades DHP, the ability to flow recirculated air through the devices to increase DHP concentrations is also limited. In aspects, the DHP devices can be provided with fresh supply of humid air, however this would usually require a redesign of the spaces and, depending on the season, may require that the new air source be heat/cooled/humidified prior to flowing through the DHP device.

Other factors that affect levels of DHP include the treatment area itself such as the number entryways, halls, doors, windows, types of building materials, the number of occupants, turnover of occupants, maintenance activities (cleaning and cleaning supplies). Surfaces that accumulate static charges are particularly consumptive of DHP. The purposes of the treatment space are also relevant to achieving an average level of at least 5.0 ppb DHP.

Reaching a steady state concentration of DHP in a treatment area occurs through a two stage process. First, there is an initial conditioning phase (also "deployment phase") followed by a maintenance or treatment phase. During initial conditioning of a treatment space, much of the DHP produced is quickly used up as it reacts with environment. An important sink of DHP in an environment are accumulated levels of volatile organic compounds (VOCs). These react with DHP and are slowly degraded sequentially as the DHP reacts and is used up. In aspects, this phase of conditioning is accompanied by measurable increases in humidity. Similarly, detectable levels of VOCs decrease over time and generally are maintained below threshold detection levels during the maintenance phase. Sensitive and affordable tools for the measurement of VOCs are available and are capable of measuring levels down to 0.1 ppm. DHP equilibrium levels can be expected to be low during this conditioning or acclimatization period of DHP consumption, ranging between 5 parts per billion and 20 parts per billion. Once the accumulated levels of VOCs are degraded, the DHP generating devices need to produce sufficient amounts of DHP to degrade ongoing sources of VOCs and further provide sufficient amounts to maintain an average DHP level of between 5.0 and 20 parts-per-billion (ppb). The amount necessary depends on each environment as sources of VOCs are varied and highly variable.

During the conditioning or deployment phase, the treatment area and DHP devices undergo a number of anticipated behaviors. First, in multi-source systems, the suite of DHP generating devices act as a combined system acting collectively to service the entire treatment area. Loss of a source jeopardizes the success of the system as it results in DHP dead spaces and further lowers the concentration of DHP in other areas as gas diffuses from higher concentrations to low as required by Fick's First Law of Diffusion. Obviously the loss of DHP allows for the regrowth of microbes so monitoring and replacing defective devices is essential.

At the beginning of the deployment, the DHP generators will first be confronted with the accumulated VOC load ambient to the treatment area. VOCs have been observed to consume most of the DHP produced by the generators for one to seven days, depending on the degree of load. During this time, as VOCs are converted into carbon dioxide and humidity by DHP, a small rise in relative humidity is often be noted. On the average, this will be 3% to 5%, but may be as much as 10% to 20% under extreme accumulated VOC loads. DHP equilibrium levels can be expected to be low during this period of DHP consumption, ranging between 1.0 parts per billion and 20 parts per billion.

Relative humidity eventually returns to normal levels, and this observation indicates that accumulated VOCs have been oxidized. In some aspects, VOCs may be directly monitored to detect the end of this initial VOC reduction phase. Also notable during the conditioning phase is the reduction of ambient odor levels throughout the treatment area as various organic odorants are degraded. During this initial period, as accumulated VOCs are oxidized, the catalytic sails age more rapidly than normal and should be replaced after one week of operation to ensure that the desired steady state levels can be achieved and maintained.

The present disclosure provides for methods to prepare DHP containing environments that address areas having a high reaction burden. In most environments, a one week conditioning period is period is to reduce the reaction burden of accumulated VOCs and other species and accumulate increased levels of DHP. In some aspects, the conditioning period may be extended up to a full month. In aspects, conditioning requires an additional week.

As accumulated VOCs are removed, DHP equilibrium levels will increase until they reach an average concentration of at least 5.0 parts per billion up to 50 ppb. These levels can be sustained indefinitely with periodic DHP generator maintenance. Lower DHP equilibrium levels within this range can be expected in environments where the daily rate of VOC evolution is highest, and higher DHP equilibrium levels in environments where the daily rate of VOC evolution is lowest. In an aspect, the average DHP concentration is at least 10 ppb. In other aspects, the average DHP concentration is maintained at least 20 ppb. As provided by the methods, the DHP concentration should be maintained between 5.0 and 50 ppb.

Once steady state levels of DHP are attained as evidenced by direct DHP measurements, indirect VOC measurements, or historical relative humidity measurements, the methods include, and provide for, a maintenance phase. Under sustained operations during the maintenance phase, sails should be replaced every two to three months. While the sails have been observed to provide sufficient DHP production for longer periods depending on the environment, the risk of regrowth of microbes dictates a cautious replacement schedule.

The present disclosure provides for, and includes, a method for establishing a DHP containing environment for microbial reduction comprising installing at least one catalytic sail Dry Hydrogen Peroxide (DHP) generating device in an environment for microbial reduction, operating said at least one DHP generating device to produce and distribute DHP, providing a conditioning time for conditioning said environment with DHP and monitoring VOC and DHP concentrations, replacing the catalytic sail and establishing a DHP concentration of at least 5.0 ppb in said environment, and maintaining DHP at a concentration between 1 and 50 parts-per-billion (ppb) for at least one week. In an aspect, the method further comprises using a fresh, unused catalytic sail. In further aspect, the method further comprises replacing the catalytic sail on or more times depending on the reaction burden and occupation burden. In certain aspects, the concentration of DHP is maintained between 5.0 and 30 ppb.

The present disclosure provides for, and includes, a treatment area having at least one DHP source per 325 cubic meters ($m^3$) using current devices. In general, DHP generating devices are limited for practical reasons to those that can fit into standard HVAC ducts. Stand-alone systems employ similarly sized sails as to remain unobtrusive and not interfere with hospital or room activities. Accordingly, DHP generating devices generally have sails between 0.5 square feet and 1 square foot and are illuminated with about 0.004 to 0.051 milliwatts/$cm^2$. As provided herein, the maximum distance of a DHP source should be no more than 20 meters from the treatment targets (e.g., surfaces and air). In some aspects, for example treatment areas having elevated reaction burdens, the DHP source should be no more than 15 meters from the treatment targets (e.g., surfaces and air). In some aspects, the maximum distance between DHP sources is 10 meters. The number and configuration of sources should be tested to confirm the production and maintenance of at least an average of 5.0 ppb DHP gas in the treatment environment. Preferably, the sources should maintain an average DHP gas concentration in the treatment area of between 5.0 to 50 ppb. For safety reasons in view of levels approved by OSHA, DHP levels should be monitored and maintained at a level of 200 ppb or less. At levels beginning at about 238 ppb, detection of DHP using approved methods begins to approach the maximum safe level of 1.0 ppm established by OSHA by the use of VHP.

In aspects according the present specification, a treatment area has at least three (3) sources of DHP each placed no more than 20 meters from another on average. In an aspect, a treatment environment has a DHP source for each 130 square meter area (e.g., about 1400 square feet) having 2.5 meter ceilings (about 8 feet) for a total treatable air volume of about 325 meters$^3$). In an aspect, a treatment area has at least three (3) sources of DHP each placed no more than 15 meters from another on average. In an aspect, the number of DHP sources in a treatment area is at least four (4), each placed no more than 20 meters from each other. In another aspect, the number of DHP sources in a treatment area is at least four (4), each placed no more than 15 meters from each other. In certain aspects, the maximum average distance between DHP sources is 10 meters. Depending on the size of the space, additional DHP sources may be added and placed no more than an average of 10, 15, or 20, meters from each other.

The approximate number of devices necessary can be determined by the overall size of the treatment area where the area is divided into unit areas. The present methods provide for at least one DHP generator for each unit areas that are between about 100 and about 185 square meters ($m^2$). In some aspects, for example spaces with lower occupation, fewer evolving VOCs, and lower line loses, can be supplied with fewer devices. In an aspect, a device is provided for each 110 $m^2$. In an aspect, a device is provided for each unit area of about 150 $m^2$. In other aspects, a DHP generating device is provided for each unit area of about 175 $m^2$. In the alternative, the treatment area can be divided into unit volumes. In aspects according to the present disclosure, a DHP generating device is provided for each unit volume of between 275 and 460 cubic meters ($m^3$). In aspects, the unit volume per device is about 300 $m^3$. In another aspect, the unit volume is about 350 $m^3$. In other aspects, the unit volume is about 400 per devices. Notably, the size constrains above apply to each volume with devices placed no further than an average of 20 meters from the other devices.

In some aspects, the method provides for isolating the treatment area from the surrounding space. While inefficient, such arrangements are made when conditioning the entire ward or HVAC zone is impracticable. When isolated, the number of devices is increased so that the average unit area can be as low as 50 or 75 $m^2$. In aspects the unit volume for a device would be as low as 150 or 200 $m^3$. In practice, for a 40,000 square foot treatment area in a healthcare facility, 28 to 29 DHP sources are installed.

In aspects of the present disclosure, the treatment area comprises an HVAC zone.

The methods further provide for directing the flow of DHP containing air from said DHP sources. The most efficient configuration is to place DHP devices at or near the diffuser on air supply vents.

The present specification provides for and include for methods of reducing nosocomial infections in healthcare treatment areas. Nosocomial infections often referred to as hospital-acquired infections (HAI) are those infections acquired during hospitalization or while resident in a health care facility. Methods for reducing nosocomial infections can be implemented as part of a comprehensive preventative, pro-active effort or provided to treatment areas in need of infection reduction after detection of high infection rates or increasing infection rates in a treatment area.

Methods for reducing nosocomial infections in a healthcare treatment area comprise providing one or more Dry Hydrogen Peroxide (DHP) generating devices for each 110 and 185 square meters and a total volume of between 275 and 460 cubic meters, maintaining the healthcare treatment area at an average concentration of at least 5.0 parts per billion up to 50 ppb and distributed throughout 90% of volume of the treatment area for at least three months and wherein nosocomial infections of patients at risk are reduced by at least 25% measured on a 3 month window. In aspects, the concentration of DHP gas is maintained at between 30 and 60 ppb. In aspects, the DHP concentration is less than 60 ppb. In aspects according to the present disclosure, the healthcare treatment area is an air conditioned treatment area maintained at a humidity of between 30 to 60% and a temperature of between 68° C. and 73° C. See EC.02.06.01, EP 13.

In aspects, the methods of reducing nosocomial infections in a healthcare treatment area comprise reducing microbial loads on sampled surfaces by at least 70% compared to an untreated treatment area of similar size and use. In aspects, the microbial load is reduced by at least 70% compared to the same treatment space before DHP treatment when measured for the same periods of time.

The present specification provides for, and includes, methods for reducing nosocomial infections in a healthcare treatment area comprise reducing the number of microbial positive sampled surfaces by least 70% compared to an untreated treatment area. In aspects, the number of microbial positive sampled surfaces is reduced by at least 70% compared to the same treatment space before DHP treatment when measured for the same periods of time. In aspects, the reductions are measured and compared over a 3 month period, a 6 month period, or a yearly period. The methods provides for reducing microbial positive sampled surfaces in healthcare facility by at least 70% on sampled surfaces and maintaining said reduced levels for at least 30 days. In aspects, the methods provide for reducing microbial positive sampled surfaces in a healthcare facility by at least 80% on sampled surfaces and maintaining said reduced levels for at least 30 days. In aspects, the microbial positive sampled surfaces are reduced by at least 90%. In other aspects, the bacteria are reduced by 95%, 99.0%, 99.9%. Once reduced, the bacterial levels are maintained for at least 2 months, 3 months, 6 months or one year. In aspects, the methods provide for reducing microbial levels to less than 5 colony forming units (cfu) per square centimeter ($cm^2$) on high touch surfaces.

The present specification provides for, and includes, methods for reducing nosocomial infections in an active healthcare treatment area comprise reducing the number of microbial positive sampled surfaces by least 70% compared to an untreated treatment area and reducing the incidence of HAI infections by at least 10%. In aspects, the number of microbial positive sampled surfaces is reduced by at least 70% compared to the same treatment space before DHP treatment and reducing the incidence of HAI infections by at least 10% when measured for the same periods of time. In aspects, the reductions are measured and compared over a 3 month period, a 6 month period, or a yearly period. The methods provides for reducing microbial positive sampled surfaces in healthcare facility by at least 70% on sampled surfaces and maintaining said reduced levels for at least 30 days and reducing the incidence of HAI infections by at least 10%. In aspects, the methods provide for reducing microbial positive sampled surfaces in a healthcare facility by at least 80% on sampled surfaces and maintaining said reduced levels for at least 30 days, and reducing the incidence of HAI infections by at least 10%. In aspects, the microbial positive sampled surfaces are reduced by at least 90% and reducing the incidence of HAI infections by at least 10%. In other aspects, the bacteria are reduced by 95%, 99.0%, 99.9% and reducing the incidence of HAI infections by at least 10%. Once reduced, the bacterial levels are maintained for at least 2 months, 3 months, 6 months or one year and the incidence of HAI infections is reduced by at least 10%. In aspects, the methods provide for reducing microbial levels to less than 5 colony forming units (cfu) per square centimeter ($cm^2$) on high touch surfaces. The present methods provide for and include, reductions in the incidence of HAI infections in treated active healthcare environments by greater than 10% when compared to a similarly situated, untreated area over a three month period. In aspects, the comparison period is at least 6 months. In other aspects, the comparison period is at least one year. Also included are reductions in the incidence of HAIs by at least 20% when compared to an untreated active healthcare treatment area. Also provided for, and included are reductions in the incidence of HAIs of 30% or more, when compared to an untreated active healthcare treatment area of a comparison period. In aspects, the number of HAIs is reduced between 10 and 20%. In other aspects, the number of HAIs is reduced between 10 and 50%, compared to an untreated active healthcare treatment area of a comparison period. Also included reductions of between 20 to 40%, 30 to 40%, 30 to 50%, 30 to 60%, or more. The methods further provide for reductions of greater than 50% when compared to an untreated active healthcare treatment area of a comparison period.

The present specification provides for, and includes, methods for reducing nosocomial infections in an active healthcare treatment area comprise reducing the number of microbial positive sampled surfaces by least 70% compared to an untreated treatment area and reducing the incidence of HAI infections by at least 20%. In aspects, the number of microbial positive sampled surfaces is reduced by at least 70% compared to the same treatment space before DHP treatment and reducing the incidence of HAI infections by at least 20% when measured for the same periods of time. In aspects, the reductions are measured and compared over a 3 month period, a 6 month period, or a yearly period. The methods provides for reducing microbial positive sampled surfaces in healthcare facility by at least 70% on sampled surfaces and maintaining said reduced levels for at least 30 days and reducing the incidence of HAI infections by at least 20%. In aspects, the methods provide for reducing microbial positive sampled surfaces in a healthcare facility by at least 80% on sampled surfaces and maintaining said reduced levels for at least 30 days, and reducing the incidence of HAI infections by at least 20%. In aspects, the microbial positive sampled surfaces are reduced by at least 90% and reducing the incidence of HAI infections by at least 20%. In other aspects, the bacteria are reduced by 95%, 99.0%, 99.9% and reducing the incidence of HAI infections by at least 20%. Once reduced, the bacterial levels are maintained for at least 2 months, 3 months, 6 months or one year and the incidence of HAI infections is reduced by at least 20%. The present methods provide for and include, reductions in the incidence of HAI infections in treated active healthcare environments by greater than 20% when compared to a similarly situated, untreated area over a three month period. In aspects, the comparison period is at least 6 months. In other aspects, the comparison period is at least one year. In aspects, the number of HAIs is reduced between 20 and 30%. In other aspects, the number of HAIs is reduced between 20 and 50%, compared to an untreated active healthcare treatment area of a comparison period.

The present specification provides for, and includes, methods for reducing nosocomial infections in an active healthcare treatment area comprise reducing the number of microbial positive sampled surfaces by least 70% compared to an untreated treatment area and reducing the incidence of HAI infections by at least 30%. In aspects, the number of microbial positive sampled surfaces is reduced by at least 70% compared to the same treatment space before DHP treatment and reducing the incidence of HAI infections by at least 30% when measured for the same periods of time. In aspects, the reductions are measured and compared over a 3 month period, a 6 month period, or a yearly period. The methods provides for reducing microbial positive sampled surfaces in healthcare facility by at least 70% on sampled surfaces and maintaining said reduced levels for at least 30 days and reducing the incidence of HAI infections by at least 30%. In aspects, the methods provide for reducing microbial positive sampled surfaces in a healthcare facility by at least 80% on sampled surfaces and maintaining said reduced levels for at least 30 days, and reducing the incidence of HAI infections by at least 30%. In aspects, the microbial positive sampled surfaces are reduced by at least 90% and reducing the incidence of HAI infections by at least 30%. In other aspects, the bacteria are reduced by 95%, 99.0%, 99.9% and reducing the incidence of HAI infections by at least 30%. Once reduced, the bacterial levels are maintained for at least 2 months, 3 months, 6 months or one year and the incidence of HAI infections is reduced by at least 30%. The present methods provide for and include, reductions in the incidence of HAI infections in treated active healthcare environments by greater than 30% when compared to a similarly situated, untreated area over a three month period. In aspects, the comparison period is at least 6 months. In other aspects, the comparison period is at least one year. In aspects, the number of HAIs is reduced between 30 and 40%. In other aspects, the number of HAIs is reduced between 30 and 50%, compared to an untreated active healthcare treatment area of a comparison period.

In aspects, the methods of reducing nosocomial infections in a healthcare treatment area comprise reducing the number of MRSA positive sampled surfaces by least 70% compared to an untreated treatment area. In aspects, the number of MRSA positive sampled surfaces is reduced by at least 70% compared to the same treatment space before DHP treatment when measured for the same periods of time. In aspects, the reductions are measured and compared over a 3 month period, a 6 month period, or a yearly period. The methods provides for reducing MRSA positive sampled surfaces in healthcare facility by at least 70% on sampled surfaces and maintaining said reduced levels for at least 30 days. In aspects, the methods provide for reducing MRSA positive sampled surfaces in a healthcare facility by at least 80% on sampled surfaces and maintaining said reduced levels for at least 30 days. In aspects, the MRSA positive sampled surfaces are reduced by at least 90%. In other aspects, the bacteria are reduced by 95%, 99.0%, 99.9%. Once reduced, the bacterial levels are maintained for at least 2 months, 3 months, 6 months or one year. In aspects, the methods provide for reducing MRSA levels to less than 5 colony forming units (cfu) per square centimeter ($cm^2$) on high touch surfaces.

In aspects, the methods of reducing nosocomial infections in a healthcare treatment area comprise reducing the number of aerobic bacterial colonies (ABC) positive sampled surfaces by least 70% compared to an untreated treatment area. In aspects, the number of ABC positive sampled surfaces is reduced by at least 70% compared to the same treatment space before DHP treatment when measured for the same periods of time. In aspects, the reductions are measured and compared over a 3 month period, a 6 month period, or a yearly period. The methods provides for reducing ABC positive sampled surfaces in healthcare facility by at least 70% on sampled surfaces and maintaining reduced levels for at least 30 days. In aspects, the methods provide for reducing ABC positive sampled surfaces in a healthcare facility by at least 80% on sampled surfaces and maintaining reduced levels for at least 30 days. Once reduced, the bacterial levels are maintained for at least 2 months, 3 months, 6 months or one year. In aspects, the ABC positive sampled surfaces are reduced by at least 90%. In other aspects, the bacteria are reduced by 95%, 99.0%, 99.9%. In aspects, the methods provide for reducing ABC levels to less than 5 colony forming units (cfu) per square centimeter ($cm^2$) on high touch surfaces.

In aspects, the methods of reducing nosocomial infections in a healthcare treatment area comprise reducing the number of *C. difficile* positive sampled surfaces by least 70% compared to an untreated treatment area. In aspects, the number of *C. difficile* positive sampled surfaces is reduced by at least 70% compared to the same treatment space before DHP treatment when measured for the same periods of time. In aspects, the reductions are measured and compared over a 3 month period, a 6 month period, or a yearly period. The methods provides for reducing *C. difficile* positive sampled surfaces in healthcare facility by at least 70% on sampled surfaces and maintaining said reduced levels for at least 30 days. In aspects, the methods provide for reducing *C. difficile* positive sampled surfaces in a healthcare facility by at least 80% on sampled surfaces and maintaining said reduced levels for at least 30 days. Once reduced, the *C. difficile* levels are maintained for at least 2 months, 3 months, 6 months or one year. In aspects, the *C. difficile* positive sampled surfaces are reduced by at least 90%. In other aspects, the bacteria are reduced by 95%, 99.0%, 99.9%. In aspects, the methods provide for reducing *C. difficile* levels to less than 5 colony forming units (cfu) per square centimeter ($cm^2$) on high touch surfaces.

In aspects, the methods of reducing nosocomial infections in a healthcare treatment area comprise reducing the number of colony forming units per plate (CFU/plate) on contact plates by least 70% compared to an untreated treatment area. In aspects, the number of CFU per contact plate is reduced by at least 70% compared to the same treatment space before DHP treatment when measured for the same periods of time. In aspects, the reductions are measured and compared over a 3 month period, a 6 month period, or a yearly period. The methods provide for reducing the CFU per contact plate in a healthcare facility by at least 70% on sampled surfaces and maintaining said reduced levels for at least 30 days. In aspects, the methods provide for reducing the CFU per contact plate in a healthcare facility by at least 80% on sampled surfaces and maintaining said reduced levels for at least 30 days. Once reduced, the CFU per contact plate are maintained for at least 2 months, 3 months, 6 months or one year. In aspects, the CFU per contact plate is reduced by at least 90%. In other aspects, the CFU per contact plate are reduced by 95%, 99.0%, 99.9%. In aspects, the methods provide for reducing CFU per contact plate levels to less than 5 colony forming units (cfu) per square centimeter ($cm^2$) on high touch surfaces.

In aspects, the number of Relative Light Units (RLU) per sample is reduced by at least 70% compared to the same treatment space before DHP treatment when measured for the same periods of time. Methods and devices for measuring RLUs are well known in the art. See Amodio and Dino, "Use of ATP bioluminescence for assessing the cleanliness of hospital surfaces: A review of the published literature (1990-2012)," *J Infect Public Health* 7(2):92-8 (2014); Omidbakhsh et al., "How Reliable Are ATP Bioluminescence Meters in Assessing Decontamination of Environmental Surfaces in Healthcare Settings?," *PLos One* 9(6):e99951 (2014) and Turner et al., "Efficacy and Limitations of an ATP-Based Monitoring System," *J. of American. Assoc. for Laboratory Animal Science* 49(2):190-195 (2010). In aspects, the reductions are measured and compared over a 3 month period, a 6 month period, or a yearly period. The methods provide for reducing the RLU per sample in a healthcare facility by at least 70% on sampled surfaces or in the air and maintaining said reduced levels for at least 30 days. In aspects, the methods provide for reducing the RLU per sample in a healthcare facility by at least 80% on sampled surfaces or in the air and maintaining said reduced levels for at least 30 days. In aspects, the RLU per sample air is reduced by at least 90%. In other aspects, the RLU per sample are reduced by 95%, 99.0%, 99.9%. RLU samples may be surface samples or air samples.

In aspects, the methods of reducing nosocomial infections in a healthcare treatment area comprise reducing microbial populations in said healthcare facility by at least an average of 90% when measured at 20 swipe sites per week over a month and maintaining said reduced levels for at least 5 weeks. In aspects, the reductions in microbes are measured and compared over a 3 month period, a 6 month period, or a yearly period. The methods provide for reducing the microbial populations per sampled surface in a healthcare facility by at least 95% on sampled surfaces and maintaining said reduced levels for at least 30 days. In aspects, the methods provide for reducing the microbial populations per sampled surface in a healthcare facility by at least an average of 99% on sampled surfaces and maintaining said reduced levels for at least 30 days. In aspects, the pathogenic bacteria per sampled surface is reduced by at least 90%. In other aspects, the microbial populations per sampled surface are reduced by 95%, 99.0%, 99.9%. In aspects, microbial populations are pathogenic bacterial populations selected from the group consisting of consisting of vancomycin-resistant enterococci (VRE), Methicillin-resistant *Staphylococcus aureus*, multidrug resistant gram-negative bacteria (MDR GNB), aerobic bacterial colonies (ABC), and *Clostridium difficile*.

In aspects, the sampled surfaces are high touch surfaces. See Huslage et al., "A Quantitative Approach to Defining High-Touch Surfaces in Hospitals," *Infect Control Hosp Epidemiol.* 31:850-853 (2010) and Huslage et al., "Microbial assessment of high-, medium-, and low-touch hospital room surfaces," *Infect Control Hosp Epidemiol.* 34(2):211-2 (2013). In other aspects, the sampled surfaces include high touch surfaces and medium touch surfaces. In aspects, at least 90% of the sampled surfaces are high touch surfaces selected from the group consisting of bed rails, head and footboard railing, tray tables, supply carts, doorknobs, push-plates, handles, elevator buttons, switches, keyboards, mice, touch screens, blood pressure cuffs, privacy curtains, blinds, windowsills, furniture and bathroom sink. In aspects, 95% of the sampled surfaces are selected from the group consisting of bed rails, head and footboard railing, tray tables, doorknobs, push-plates, handles, privacy curtains, furniture, and bathroom sink. In aspects, the sampled surfaces are selected from the group consisting of bed rails, head and footboard railing, tray tables, doorknobs, push-plates, handles, privacy curtains, furniture, and bathroom sink. In aspects the treatment area is an ICU and the high touch surfaces are selected from the group consisting of bed rail, the bed surface, and the supply cart. In aspects, the treatment area is a medical/surgical floor and the high touch surfaces are selected from the group consisting of bed rails, the overbed tables, intravenous pumps, and bed surfaces.

The present disclosure further provides for methods of microbial reduction on privacy curtains comprising continuously providing DHP at a DHP concentration of at least 1.0 parts per billion up to 50 ppb whereby levels of microbes on said curtains is reduced by at least 99%. In aspects, the levels of microbes on said curtains is reduced by at least 99.9%. In aspects, the DHP gas concentration is maintained between 1.0 and 40 ppb for the reduction of microbes on privacy curtains. In aspects, the DHP gas concentration is maintained between 5.0 and 20 ppb for the reduction of microbes on privacy curtains. In aspects, the DHP gas concentration is maintained between 5.0 and 40 ppb for the reduction of microbes on privacy curtains. In other aspects, the DHP gas concentration is maintained between 5.0 and 30 ppb.

In aspects of the present disclosure, treatment areas for methods of nosocomial infection reduction are selected from the group consisting of a ward, an HVAC zone, and an air exchange restricted room. In other aspects, the treatment areas for methods of nosocomial infection reduction are selected from the group consisting an intensive care unit (ICU), an oncology ward, a kidney dialysis unit, a neonate ICU, and a pediatric ICU.

In aspects, the methods of reducing nosocomial infections in a healthcare treatment area comprise continuously operating one or more Dry Hydrogen Peroxide (DHP) generating devices to produce and distribute DHP in said treatment area, establishing a DHP concentration of at least 1.0 parts per billion up to 50 ppb that is distributed throughout at least 90% of the volume of the treatment area, maintaining DHP at a concentration of at least 5.0 parts per billion up to 50 ppb for at least one week, and reducing pathogenic bacteria in said healthcare facility by at least 70% on sampled surfaces and maintaining said reduced levels for at least 30 days. In aspects, the treatment area provides healthcare services to patients at high risk of infection including patients selected from the group consisting of immunocompromised patients, neonatal patients, patients colonized but not infected, patient occupying rooms recently vacated by MDRO positive patients, and kidney dialysis patients. In aspects for methods of reducing nosocomial infections, the DHP gas concentration is maintained between 5.0 and 40 ppb. In other aspects, the DHP gas concentration is maintained between 5.0 and 30 ppb.

The present disclosure provides for, and includes, reducing nosocomial infections by at least 25% when measured on a 3 month window and DHP is maintained at a concentration between 5.0 and 50 ppb. In aspects for methods of reducing nosocomial infections, the DHP gas concentration is maintained between 5.0 and 40 ppb. In other aspects, the DHP gas concentration is maintained between 5.0 and 30 ppb. In some aspects, the number of nosocomial infections are reduced for patients at high risk of infection selected from the group consisting of immunocompromised patients, neonatal patients, patients colonized but not infected, patient occupying rooms recently vacated by MDRO positive patients, and kidney dialysis patients. In aspects, the reduced microbial load provide for reductions in nosocomial infections of at least 30%, 40%, 50% or more. In some aspects, nosocomial infections are largely eliminated when compared to historical levels.

The present disclosure provides for, and includes, reducing monthly reportable infections by at least 10% when measured on a 3 month window in an environment maintained at a DHP concentration of between 1.0 ppb and 50 ppb. In some aspects, the number of monthly reportable infections are reduced for patients at high risk of infection selected from the group consisting of immunocompromised patients, neonatal patients, patients colonized but not infected, patient occupying rooms recently vacated by MDRO positive patients, and kidney dialysis patients. In aspects, the reduced microbial load provide for reductions in monthly reportable infections of at least 30%, 40%, 50% or more. In some aspects, monthly reportable infections are significantly reduced when compared to historical levels. In aspects for methods of reducing reportable infections, the DHP gas concentration is maintained between 5.0 and 40 ppb. In other aspects, the DHP gas concentration is maintained between 5.0 and 30 ppb.

The present disclosure provides for, and includes, reducing the standardized infection ratio by at least 10% when measured on a 3 month window. In some aspects, the standardized infection ratio is reduced for patients at high risk of infection selected from the group consisting of immunocompromised patients, neonatal patients, patients colonized but not infected, patient occupying rooms recently vacated by MDRO positive patients, and kidney dialysis patients. In aspects, the reduced microbial load provide for reductions in standardized infection ratio of at least 30%, 40%, 50% or more. In some aspects, standardized infection ratio is significantly reduced when compared to historical levels. In aspects for methods of reducing standardize infection ratio, the DHP gas concentration is maintained between 5.0 and 40 ppb. In other aspects, the DHP gas concentration is maintained between 5.0 and 30 ppb.

The present specification provides for and include for methods of reducing the number of linked infections in healthcare treatment areas. Linked infections are subset of HAI infections that are a single strain of pathogenic bacteria and traceable to a primary source. Methods for reducing the number of linked infections included identifying a linked infection, providing DHP at a continuous concentration of at least 5.0 ppb up to 50 ppm, and maintaining the DHP concentration until the number of linked infections is reduced. In aspects, where DHP is already provided, the methods further include increasing the minimal level of DHP to at least 10 ppb. In other aspects, the DHP levels are increased to at least 20 ppb in order to reduce linked infections. Methods for reducing linked infections are usually implemented as part of a comprehensive preventative, pro-active effort including isotyping the infectious agent. In aspects for methods of reducing the number of linked infections, the DHP gas concentration is maintained between 5.0 and 40 ppb. In other aspects, the DHP gas concentration is maintained between 5.0 and 30 ppb.

Methods for reducing the number of linked infections in a healthcare treatment area comprises providing one or more Dry Hydrogen Peroxide (DHP) generating devices for each 110 and 185 square meters and a total volume of between 275 and 460 cubic meters maintaining the healthcare treatment area at an average concentration of at least 5.0 parts per billion. In further aspects, the concentration of DHP gas is maintained at between 5.0 and 30 ppb. In aspects, the DHP concentration is less than 60 ppb. In aspects according to the present disclosure, the healthcare treatment area is an air conditioned treatment area maintained at a humidity in critical areas (e.g., ICUs, surgical suites, burn treatment areas) of between 30 to 60% and a temperature of between 68° C. and 73° C. See EC.02.06.01, EP 13. In aspects, treatment areas are maintained at a humidity in critical areas (e.g., ICUs, surgical suites, burn treatment areas) of between 20 to 70% and a temperature of between 68° C. and 73° C.

The present specification provides for, and includes, reducing the number of linked infections by at least 25% when compared to historical levels. In an aspect, the number of linked infections by at least 25% when compared to at least a three month prior period without DHP. In aspects, the number of linked infections is reduced between 25 and 50% compared to conditions without DHP treatment.

The present specification provides for and include for methods of reducing the secondary spread of infections in healthcare treatment areas. Methods for reducing the secondary spread of infections included identifying a primary infection needing prevention of a secondary infection, providing DHP at a continuous concentration of at least 5.0 ppb, and maintaining the DHP concentration until the threat of secondary spread of the infection is reduced. In aspects, DHP is continuously provided at between 10 to 20 ppb. In aspects, where DHP is already provided, the methods further include increasing the minimal level of DHP to at least 10 ppb. In other aspects, the DHP levels are increased to at least 20, 30, or 40 ppb in order to reduce the secondary spread of infection. Methods for reducing the secondary spread of infections are usually implemented as part of a comprehensive preventative, pro-active effort including isotyping the infectious agent.

Methods for reducing the secondary spread of infections in a healthcare treatment area comprises providing one or more DHP generating devices for each 110 and 185 square meters and a total volume of between 275 and 460 cubic meters maintaining the healthcare treatment area at an average concentration of at least 5.0 parts per billion. In further aspects, the concentration of DHP gas is maintained at between 5.0 and 50 ppb. In aspects, the DHP concentration is less than 60 ppb. In aspects according to the present disclosure, the healthcare treatment area is an air conditioned treatment area maintained at a humidity of between 20 to 60% and a temperature of between 68° C. and 73° C. See EC.02.06.01, EP 13. In aspects of the present disclosure, reducing the secondary spread of infection includes adding one or more additional DHP producing units to increase the total DHP concentration above the desired at least 20 ppb. In aspects, the methods provide for a "crash cart" comprising one or more additional DHP devices that can be added to a location to temporarily increase the local concentration of DHP to 30, 40, or 50 ppb and maintaining the higher DHP concentration for 1, 2 or 3 weeks, or until the threat of secondary infection has subsided.

The present specification provides for and include for methods of reducing multidrug-resistant organisms (MDROs) on surfaces in healthcare treatment areas. Methods for reducing MDROs can be implemented as part of a comprehensive preventative, pro-active effort or provided to treatment areas in need of infection reduction after detection of high infection rates or increasing infection rates in a treatment area.

Methods for reducing MDROs in a healthcare treatment area comprise providing one or more DHP generating devices for each 110 and 185 square meters and a total volume of between 275 and 460 cubic meters maintaining the healthcare treatment area at an average concentration of at least 5.0 parts per billion up to 50 ppb and distributed throughout 90% of volume of the treatment area for at least three months and wherein nosocomial infections of patients at risk are reduced by at least 25% measured on a 3 month window. In aspects, the concentration of DHP gas is maintained at between 5.0 and 30 ppb. In aspects, the DHP concentration is less than 60 ppb. In aspects according to the present disclosure, the healthcare treatment area is an air conditioned treatment area maintained at a humidity of between 20 to 60% and a temperature of between 68° C. and 73° C. See EC.02.06.01, EP 13.

In aspects, the methods of reducing MDROs on surfaces in a healthcare treatment area comprise reducing MDRO loads on sampled surfaces by at least 70% compared to an untreated treatment area of similar size and use. In aspects, the MDRO load is reduced by at least 70% compared to the same treatment space before DHP treatment when measured for the same periods of time.

In aspects, the methods of reducing MDROs on surfaces in a healthcare treatment area comprise reducing the number of MDRO positive sampled surfaces by least 70% compared to an untreated treatment area. In aspects, the number of MDRO positive sampled surfaces is reduced by at least 70% compared to the same treatment space before DHP treatment when measured for the same periods of time. In aspects, the reductions are measured and compared over a 3 month period, a 6 month period, or a yearly period. The methods provides for reducing MDRO positive sampled surfaces in healthcare facility by at least 70% on sampled surfaces and maintaining said reduced levels for at least 30 days. In aspects, the methods provide for reducing MDRO positive sampled surfaces in a healthcare facility by at least 80% on sampled surfaces and maintaining said reduced levels for at least 30 days. In aspects, the MDRO positive sampled surfaces are reduced by at least 90%. In other aspects, the bacteria are reduced by 95%, 99.0%, 99.9%. In aspects, the methods provide for reducing MDRO levels to less than 5 colony forming units (cfu) per square centimeter ($cm^2$) on high touch surfaces.

In aspects, the methods of reducing MDROs on surfaces in a healthcare treatment area comprise reducing the number of colony forming units per plate (CFU/plate) on contact plates by least 70% compared to an untreated treatment area. In aspects, the number of CFU per contact plate is reduced by at least 70% compared to the same treatment space before DHP treatment when measured for the same periods of time. In aspects, the reductions are measured and compared over a 3 month period, a 6 month period, or a yearly period. The methods provide for reducing the CFU per contact plate in a healthcare facility by at least 70% on sampled surfaces and maintaining said reduced levels for at least 30 days. In aspects, the methods provide for reducing the CFU per contact plate in a healthcare facility by at least 80% on sampled surfaces and maintaining said reduced levels for at least 30 days. In aspects, the CFU per contact plate is reduced by at least 90%. In other aspects, the CFU per contact plate are reduced by 95%, 99.0%, 99.9%. In aspects, the methods provide for reducing CFU per contact plate levels to less than 5 colony forming units (cfu) per square centimeter (cm$^2$) on high touch surfaces.

In aspects, method of reducing MDROs includes reducing the average number of RLU per sample by at least 70% compared to the same treatment space before DHP treatment when measured for the same periods of time. Methods and devices for measuring RLUs are well known in the art. In aspects, the reductions are measured and compared over a 3 month period, a 6 month period, or a yearly period. The methods provide for reducing the RLU per sample in a healthcare facility by at least 70% on samples and maintaining said reduced levels for at least 30 days. In aspects, the methods provide for reducing the RLU per sample in a healthcare facility by at least 80% on sample and maintaining said reduced levels for at least 30 days. In aspects, the RLU per sample is reduced by at least 90%. In other aspects, the RLU per sampled surface are reduced by 95%, 99.0%, 99.9%. RLU samples can be collected from surfaces or from the air.

In aspects, the methods of reducing MDROs on surfaces in a healthcare treatment area comprise reducing MDRO populations in said healthcare facility by at least an average of 90% when measured at 20 swipe sites per week over a month and maintaining said reduced levels for at least 5 weeks. In aspects, the reductions in MDROs are measured and compared over a 3 month period, a 6 month period, or a yearly period. The methods provide for reducing the MDROs per sampled surface in a healthcare facility by at least 95% on sampled surfaces and maintaining said reduced levels for at least 30 days. In aspects, the methods provide for reducing the MDROs per sampled surface in a healthcare facility by at least an average of 99% on sampled surfaces and maintaining said reduced levels for at least 30 days. In aspects, the MDROs per sampled surface is reduced by at least 90%. In other aspects, the MDROs per sampled surface are reduced by 95%, 99.0%, 99.9%. In aspects, MDROs are pathogenic bacterial populations selected from the group consisting of consisting of vancomycin-resistant enterococci (VRE), Methicillin-resistant *Staphylococcus aureus*, multi-drug resistant gram-negative bacteria (MDR GNB), aerobic bacterial colonies (ABC), and *Clostridium difficile*.

In aspects, the sampled surfaces are high touch surfaces. In other aspects, the sampled surfaces include high touch surfaces and medium touch surfaces. In aspects, at least 90% of the sampled surfaces are high touch surfaces selected from the group consisting of bed rails, head and footboard railing, tray tables, supply carts, doorknobs, push-plates, handles, elevator buttons, switches, keyboards, mice, touch screens, blood pressure cuffs, privacy curtains, blinds, windowsills, furniture and bathroom sink. In aspects, 95% of the sampled surfaces are selected from the group consisting of bed rails, head and footboard railing, tray tables, doorknobs, push-plates, handles, privacy curtains, furniture, and bathroom sink. In aspects, the sampled surfaces are selected from the group consisting of bed rails, head and footboard railing, tray tables, doorknobs, push-plates, handles, privacy curtains, furniture, and bathroom sink. In aspects the treatment area is an ICU and the high touch surfaces are selected from the group consisting of bed rail, the bed surface, and the supply cart. In aspects, the treatment area is a medical/surgical floor and the high touch surfaces are selected from the group consisting of the bed rail, the overbed table, the intravenous pump, and the bed surface. In aspects, the sampled surfaces are medium touch surfaces selected from the group consisting of The present disclosure further provides for methods of MDROs on privacy curtains comprising continuously providing DHP at a DHP concentration of at least 1.0 parts per billion up to 50 ppb whereby levels of microbes on said curtains is reduced by at least 99%.

In aspects of the present disclosure, treatment areas for methods of reducing MDROs on surfaces are selected from the group consisting of a ward, an HVAC zone, and an air exchange restricted room. In other aspects, the treatment areas for methods of reducing MDROs on surfaces are selected from the group consisting an intensive care unit (ICU), an oncology ward, a kidney dialysis unit, a neonate ICU, and a pediatric ICU.

In aspects, the methods of reducing MDROs on surfaces in a healthcare treatment area comprise continuously operating one or more Dry Hydrogen Peroxide (DHP) generating devices to produce and distribute DHP in said treatment area, establishing a DHP concentration of at least 1.0 parts per billion up to 50 ppb that is distributed throughout at least 90% of the volume of the treatment area, maintaining DHP at a concentration of at least 5.0 parts per billion up to 50 ppb for at least one week, and reducing MDROs on surfaces in said healthcare facility by at least 70% on sampled surfaces and maintaining said reduced levels for at least 30 days. In aspects, the treatment area provides healthcare services to patients at high risk of infection including patients selected from the group consisting of immunocompromised patients, neonatal patients, patients colonized but not infected, patient occupying rooms recently vacated by MDRO positive patients, and kidney dialysis patients.

As used herein, DHP comprises gaseous hydrogen peroxide ($H_2O_2$) that is substantially free of hydration, ozone, plasma species, or organic species. DHP can be measured using methods known in the art. A preferred method to measure DHP that avoids cross-reactivity with other oxidizing agents is performed using a Picarro PI2114 Gas Concentration Analyzer (Picarro, Inc., California) measures hydrogen peroxide levels as low as 3 ppb. The Picarro devices uses Cavity Ring-Down Spectroscopy (CRDS) that measures the unique near-infrared absorption spectrum and an effective pathlength measured in kilometers. The Picarro CRDS approach can distinguish between closely related oxidizing molecules such as superoxide ($O_2^-$). The Interscan 4000 Series Hydrogen Peroxide ($H_2O_2$) Gas Analyzer can also be employed (Interscan Corporation, California). Interscan devices measure oxidizing molecules using an electrochemical voltametric sensor that can cross-detect other oxidizers such as superoxide ($O_2^-$), hydroxyl radicals (OH*), ozone ($O_3$), and other reactive species. The presence of other oxidizing species can be observed close to the source and decreases with distance. In contrast to most oxidizing molecules made from non-thermal plasmas, DHP is stable and can be detected at low levels throughout the space. Thus, by comparing the values close to the source and at a distance, the presence of non-DHP oxidizing molecules can be inferred. In general, these non-DHP contribute a few parts-per-billion to the overall measurement.

As used herein, the term "free of ozone" or "substantially free of ozone" means an amount of ozone below about 0.015 ppm ozone. In an aspect, "free of ozone" means that the amount of ozone produced by the device is below or near the level of detection (LOD) using conventional detection means. Ozone detectors are known in the art and have detection thresholds in the parts per billion using point ionization detection. A suitable ozone detector is the Honeywell Analytics Midas® gas detector.

As used herein, "free of hydration" means that the hydrogen peroxide gas is at least 99% free of water molecules bonded by electrostatic attraction and London Forces. Hydrated forms of hydrogen peroxide are produced by evaporation and atomization of aqueous hydrogen peroxide (AHP). Aerosols and vapors produced from AHP are a hydrated form of hydrogen peroxide having each molecule surrounded by shell of water molecules (hydration shell) bonded by electrostatic attraction and London Forces. While there are various "drying" methods, such methods cannot remove the hydration shell. Also as used herein, a DHP that is free of plasma species means hydrogen peroxide gas that is at least 99% free of hydroxide ion, hydroxide radical, hydronium ion, hydrogen radical, and combinations thereof.

As used herein the term "about" refers to ±10%.

As used herein, a "treatment area" refers to discrete, isolated area that has limited exchange of air with adjacent areas. In aspects, treatment area refers to a single zone of a heating, ventilation, and air conditioning (HVAC) system. An HVAC zone is defined as an area serviced by a single air handler, where all space within the discrete environment receives supply air from its dedicated single air handler, and all air recycled from that space is returned to that same air handler. Also included are isolated areas within an HVAC zone where the exchange of air with adjacent areas has been limited by sealing vents and returns and otherwise limiting the dilution of DHP. In aspects, a treatment area may be a single open plan ward, an intensive care unit (ICU), an oncology ward, a kidney dialysis unit, a neonate ICU, a pediatric ICU. Treatment areas in need of DHP treatment are areas of healthcare facilities including, but not limited to, licensed hospitals, Licensed Ambulatory Surgical Centers (LASC), Certified Mammography Services center (CMS), a certified rural health clinic (CRHC), Long Term Acute Care (LTAC), nursing homes, an end stage renal dialysis center (RDC).

The terms "comprises," "comprising," "includes," "including," "having," and their conjugates mean "including but not limited to."

As used herein the term "higher" refers to at least about 3%, 5%, 7%, 10%, 15%, 20%, 25%, 30%, 50%, 60%, 70%, 80%, 90%, or even a few folds higher.

As used herein, the terms "improving" and "increasing" refer to at least about 2%, at least about 3%, at least about 4%, at least about 5%, at least about 10%, at least about 15%, at least about 20%, at least about 25%, at least about 30%, at least about 35%, at least about 40%, at least about 45%, at least about 50%, at least about 60%, at least about 70%, at least about 80%, at least about 90%, or greater increase.

As used herein, the term "less" refers to at least about 3%, 5%, 7%, 10%, 15%, 20%, 25%, 30%, 50%, 60%, 70%, 80%, 90%, or even a few folds lower.

As used herein, the terms "reducing" and "decreasing" refer to at least about 2%, at least about 3%, at least about 4%, at least about 5%, at least about 10%, at least about 15%, at least about 20%, at least about 25%, at least about 30%, at least about 35%, at least about 40%, at least about 45%, at least about 50%, at least about 60%, at least about 70%, at least about 80%, at least about 90%, or greater decrease.

The term "consisting of" means "including and limited to."

The term "consisting essentially of" means that the composition, method, or structure may include additional ingredients, steps, and/or parts, but only if the additional ingredients, steps, and/or parts do not materially alter the basic and novel characteristics of the claimed composition, method, or structure.

As used herein, the singular form "a," "an," and "the" include plural references unless the context clearly dictates otherwise. For example, the term "a compound" or "at least one compound" may include a plurality of compounds, including mixtures thereof.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

As used herein the term "method" refers to manners, means, techniques, and procedures for accomplishing a given task including, but not limited to, those manners, means, techniques, and procedures either known to or readily developed from known manners, means, techniques, and procedures by practitioners of the agronomic, chemical, pharmacological, biological, biochemical, and medical arts. Methods may include single or multiple steps.

In aspects according to the present disclosure, an enclosure comprises a volume having at least one opening for the entry of air and at least one opening for the discharge of air having dry hydrogen peroxide gas. In some aspects, the enclosure may be prepared from polyethylene, polypropylene, polystyrene, nylon, or polyvinyl chloride.

As used herein, in other aspects, an enclosure can comprise a heating, ventilating, and air conditioning (HVAC) system. In other aspects, a device for producing DHP is a device placed in an HVAC system during construction. Suitable HVAC systems and appropriate standards are known in the art, for example standards developed by the Sheet Metal & Air Conditioning Contractors' National Association (SMACNA). As provided herein, devices suitable for installation into an HVAC system include the elements recited for standalone devices but wherein the enclosure and air distribution system are provided by the HVAC system. Devices suitable for installation into an HVAC system may further comprise an additional air distribution system (e.g., separate from the air distribution system of the HVAC system as a whole). Devices suitable for installation into an HVAC system may further comprise one or more additional filters to prevent contamination with dust or chemicals.

As used herein, soft surfaces are porous, flexible surfaces, usually made of fabric including but not limited to privacy curtains, blinds, furniture, sheets and clothing. Soft surfaces are significant sources of microbes and are difficult to clean and disinfect.

While the present disclosure has been described with reference to particular embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the scope of the present disclosure.

Therefore, it is intended that the present disclosure not be limited to the particular embodiments disclosed as the best mode contemplated for carrying out the present disclosure, but that the present disclosure will include all embodiments falling within the scope and spirit of the appended claims.

Embodiments Embodiment 1: A method for establishing a DHP containing environment for microbial reduction comprising:
  installing at least one catalytic sail Dry Hydrogen Peroxide (DHP) generating device having a fresh, unused catalytic sail in an environment for microbial reduction;
  operating said at least one DHP generating device to produce and distribute DHP;
  providing a conditioning time for conditioning said environment with DHP and monitoring VOC and DHP concentrations;
  replacing the catalytic sail and establishing a DHP concentration of between 1 and 50 parts-per-billion (ppb) in said environment;
  maintaining DHP at a concentration of between 1 and 50 ppb for at least one week.

Embodiment 2: The method of embodiment 1, wherein said conditioning time is at least one week or the time necessary for VOC concentrations to fall below zero when measured with a device having a sensitivity of 0.5 ppm.

Embodiment 3: The method of embodiments Error! Reference source not found. or 2, wherein said environment comprises at least one DHP generative device for each 110 to 185 square meters and a total volume of between 275 and 460 cubic meters.

Embodiment 4: The method of any one of embodiments Error! Reference source not found. to 3, wherein said protectable space is isolated from surrounding space and HVAC systems.

Embodiment 5: The method of any one of embodiments Error! Reference source not found. to 4, wherein said protectable space comprises a single zone of an HVAC system.

Embodiment 6: The method of embodiment Error! Reference source not found., comprising at least three DHP generating devices, one DHP generating device for each 110 to 185 square meters of area and a volume of between 275 and 460 cubic meters.

Embodiment 7: The method of embodiment Error! Reference source not found., wherein each of said at least three DHP generating devices are placed no more than 20 meters from a second DHP device, and arranged to provide overlapping coverage zones.

Embodiment 8: A method for reducing nosocomial infections in a healthcare treatment area in need thereof comprising:
  continuously operating one or more DHP generative devices in a treatment area in need thereof;
  establishing an average DHP concentration of at least 1.0 ppb and distributed throughout at least 90% of the volume of said treatment area;
  maintaining DHP at an average concentration of at least 5.0 parts per billion up to 40 ppb for at least one week; and
  reducing pathogenic bacteria in said healthcare facility.

Embodiment 9: The method of embodiment Error! Reference source not found., further comprising operating said DHP generating devices continuously for at least 3 months wherein nosocomial infections of patients at risk are reduced by at least 25% measured on a 3 month window.

Embodiment 9b: The method of embodiment Error! Reference source not found., further comprising operating said DHP generating devices continuously for at least 3 months wherein nosocomial infections of patients at risk are reduced by at least 25% measured on a 3 month window.

Embodiment 9c: The method of embodiment Error! Reference source not found., further comprising operating said DHP generating devices continuously for at least 3 months wherein the number of linked infections is reduced by at least 25%.

Embodiment 9d: The method of embodiment Error! Reference source not found., further comprising operating said DHP generating devices continuously for at least 3 months wherein the secondary spread of infection is reduced by at least 25%.

Embodiment 9e: The method of embodiment Error! Reference source not found., further comprising operating said DHP generating devices continuously for at least 3 months wherein the three average of the number of monthly reportable infections is decreased compared to untreated three month period.

Embodiment 9f: The method of embodiment Error! Reference source not found., further comprising operating said DHP generating devices continuously for at least 3 months wherein the standardized infection ratio (SIR) is reduced.

Embodiment 9g: The method of embodiment Error! Reference source not found., further comprising operating said DHP generating devices continuously for at least 3 months wherein said treatment area comprises a ward, an HVAC zone, an air exchange restricted room.

Embodiment 10: The method of embodiments Error! Reference source not found. or 9, wherein said healthcare treatment area is in a long-term care facility selected from the group consisting of a nursing home and a skilled nursing facility.

Embodiment 11: The method any one of embodiments Error! Reference source not found. to 10, wherein said pathogenic bacteria is selected from the group consisting of vancomycin-resistant enterococci (VRE), Methicillin-resistant *Staphylococcus aureus*, multidrug resistant gram-negative bacteria (MDR GNB), aerobic bacterial colonies (ABC), and *Clostridium difficile*.

Embodiment 12a: The method any one of embodiments Error! Reference source not found. to 11, wherein said reducing is reducing microbes by at least 70% on sampled surfaces and maintaining said reduced levels for at least 30 days.

Embodiment 12b: The method any one of embodiments Error! Reference source not found. to 11, wherein said reducing is reducing the number of at colonies on sampled surfaces by least 70% compared to an untreated treatment area of similar size and use;

Embodiment 12c: The method any one of embodiments Error! Reference source not found. to 11, wherein said reducing is reducing the number of MRSA positive sampled surfaces by least 70% compared to an untreated treatment area;

Embodiment 12d: The method any one of embodiments Error! Reference source not found. to 11, wherein said reducing is reducing the number of ABC positive sampled surfaces by least 70% compared to an untreated treatment area;

Embodiment 12e: The method any one of embodiments Error! Reference source not found. to 11, wherein said reducing is reducing the number of C. diff positive sampled surfaces by least 70% compared to an untreated treatment area;

Embodiment 12f: The method any one of embodiments Error! Reference source not found. to 11, wherein said reducing is reducing the number of colony forming units per plate (CFU/plate) on contact plates by least 70% compared to an untreated treatment area;

Embodiment 12g: The method any one of embodiments Error! Reference source not found. to 11, wherein said reducing is a reduction of pathogenic bacteria population in said healthcare facility by at least 90% when measured at 20 swipe sites per week over a month and maintaining said reduced levels for at least 5 weeks; and Embodiment 12h: The method any one of embodiments Error! Reference source not found. to 11, wherein said reducing is reducing Central line-associated bloodstream infections (CLABSI) by at least 25%.

Embodiment 13: The method of any one of embodiments 8 to Error! Reference source not found., wherein said sampled surfaces comprise high touch surfaces selected from the group consisting of bed rails, head and footboard railing, tray tables, doorknobs, push-plates, handles, elevator buttons, switches, keyboards, mice, touch screens, blood pressure cuffs, privacy curtains, blinds, windowsills, furniture and bathroom sink.

Embodiment 13: The method of any one of embodiments 8 to Error! Reference source not found., wherein said sampled surfaces comprise high touch surfaces selected from the group consisting of bed rails, head and footboard railing, tray tables, doorknobs, push-plates, handles, elevator buttons, switches, keyboards, mice, touch screens, blood pressure cuffs, privacy curtains, blinds, windowsills, furniture and bathroom sink.

Embodiment 14a: The method of any one of embodiments Error! Reference source not found. to 13, wherein pathogenic bacteria are reduced by at least 80%.

Embodiment 14b: The method of any one of embodiments Error! Reference source not found. to 13, wherein pathogenic bacteria are reduced by at least 90%.

Embodiment 14c: The method of any one of embodiments Error! Reference source not found. to 13, wherein pathogenic bacteria are reduced by at least 95%.

Embodiment 14d: The method of any one of embodiments Error! Reference source not found. to 13, wherein pathogenic bacteria are reduced by at least 99%.

Embodiment 14e: The method of any one of embodiments Error! Reference source not found. to 13, wherein pathogenic bacteria are reduced by at least 99.9%.

Embodiment 15: The method of embodiment Error! Reference source not found., wherein said treatment area is an open plan ward, an intensive care unit (ICU), an oncology ward, a kidney dialysis unit, a neonate ICU, a pediatric ICU.

Embodiment 16: The method of any one of embodiments Error! Reference source not found. to 15, wherein said healthcare facility is a licensed hospital, a Licensed Ambulatory Surgical Center, Certified Mammography Services center, a certified rural health clinic, an end stage renal dialysis center.

Embodiment 17: The method of any one of embodiments Error! Reference source not found. to 16, wherein said treatment area comprises a single zone of an heating, ventilation, and air conditioning (HVAC) system.

Embodiment 18: The method of any one of embodiments Error! Reference source not found. to 17, wherein the treatment area is maintained at a relative humidity of between 20 to 70%.

Embodiment 19: The method of any one of embodiments Error! Reference source not found. to 18, where the DHP concentration is maintained between 5 and 20 ppb.

Embodiment 20: The method of any one of embodiments Error! Reference source not found. to 19, wherein said patients at risk are selected from the group consisting of immunocompromised patients, neonatal patients, patients colonized but not infected, patient occupying rooms recently vacated by MDRO positive patients, and kidney dialysis patients.

Embodiment 21: A method of reducing multidrug-resistant organisms (MDROs) on surfaces in a healthcare treatment area comprising
continuously operating one or more Dry Hydrogen Peroxide (DHP) generating devices to produce and distribute DHP in said treatment area;
establishing a DHP concentration of at least 5.0 ppb and distributed within said treatment area;
maintaining DHP at a concentration of between 5.0 and 50 ppb for at least one week; and
reducing said multidrug-resistant organisms (MDROs) in said healthcare facility by at least 70% and maintaining said reduced levels for at least 30 days.

Embodiment 22: The method of embodiment Error! Reference source not found., further comprising reducing nosocomial infections by at least 25% when measured on a 3 month window.

Embodiment 23: The method of embodiment Error! Reference source not found. or 22, wherein said healthcare facility in need thereof is subject to reintroduction and contamination of multidrug-resistant organisms (MDROs).

Embodiment 24: The method of embodiment Error! Reference source not found., 22, or 23, wherein said distribution is throughout at least 90% of the volume of said treatment area.

Embodiment 25: A method for reducing the spread of infection in an acute infectious outbreak in a healthcare treatment area in need thereof comprising:
identifying a treatment area having an acute infection outbreak;
providing one or more Dry Hydrogen Peroxide (DHP) generating devices to produce and distribute DHP in said treatment area;
establishing a DHP concentration of between 1.0 and 50 parts-per-billion;
maintaining DHP at a concentration of at least 5.0 ppb until the acute infectious outbreak is controlled.

Embodiment 26: The method of embodiment Error! Reference source not found., wherein said treatment area has not been previously treated with DHP, is not currently being treated with DHP, or treatment area has a DHP concentration of less than 5.0 ppb on average.

Embodiment 27: The method of embodiment Error! Reference source not found., wherein said treatment area is a DHP containing treatment area and said providing comprises providing one or more stand alone DHP generating units.

EXAMPLES

Example 1: Configuration of DHP Generating Units

Target spaces are evaluated prior to installation of DHP generating units to determine the number and placement of units required. Among the variables are the characteristics of the HVAC system such as the number of vents and returns, the air turnover, the humidity and temperature.

Example 2: Community Hospital Cardiovascular/Telemetry Unit Studies

In this example, DHP is incorporated into a community hospital's existing heating ventilation and air conditioning (HVAC) system in a 34-bed Cardiovascular/Telemetry (CV-Tele or CVTL) unit. The study is designed to answer two basic and important questions: Does DHP reduce microbial contamination in the hospital unit? Can DHP reduce the observed rate of HAIs? The study consists of three phases. In phase one, culture samples are taken from hospital rooms and common work areas before and after standard disinfection of the rooms to establish a baseline of microbial colonization before the application of DHP technology. In phase two, samples are taken from the same rooms and work areas daily for one week after the institution of DHP technology. In phase three, the HAI rate in the CV-Tele unit is observed over a six-month period and compared to the same six-month window occurring in the previous year.

DHP technology is installed into the hospital's 34-bed cardiovascular telemetry unit (CV-Tele) through the existing heating ventilation and air conditioning (HVAC) system. DHP technology uses approximately 365 nanometer (nm) ultraviolet light in the UVA band to activate the catalyst. This light is non-germicidal and is safe to use in occupied areas.

DHP systems can be deployed on a stand-alone basis; or in heating, ventilation, and air conditioning (HVAC) systems. A single stand-alone DHP unit of the current design is sufficient to protect an isolated room of up to room of about 110 cubic meters in volume (6×6×3 meters). In this example, all devices are installed in the HVAC system at a ratio of one device per 1,482 square feet of treatment area and separated by no more than 20 meters, preferably no more than 15 meters. Further the multiple units are placed to ensure overlapping coverage zones. This configuration is important to establish and maintain suitable DHP levels of at least 20 ppb, preferably 30 to 50 ppb.

Phase I—Historical Analysis and Sampling

Phase I establishes a baseline of comparison for DHP employment. Historical rates of HAIs by type and location are tabulated and existing HAI mitigation strategies and procedures are catalogued. Microbial sampling of three patient rooms is conducted for selected targets on High Touch/High Use (HTHU) surfaces and air samples. Both pre and post terminal cleaning samples are collected.

Phase II—Reduction of Microbial Contaminants

Phase II assesses the ability of DHP technology to reduce microbial contaminants in the environment. High-touch/high-use (HTHU) surfaces are cultured for bacteria and fungi before standard hospital terminal cleaning and after terminal cleaning and at 48 hours, at 96 hours, and at 187 hours after cleaning. A total of 13 different surfaces are cultured from the same 3 sample patient rooms: patient bedrail, nurse call button, faucet handle, faucet, curtain, soap dispenser, toilet bowl, toilet handle, computer keyboard, computer shelf, bathroom door handle, sink, and windowsill.

DHP level monitoring, multiple technologies are employed to provide timely feedback of levels throughout the environment. During the study, steady-state DHP levels are observed to range between 1.0 ppb and 50 ppb, well below safety limits.

Continuous sampling of DHP levels is achieved with the employment of the Chemdaq Steri-Trac Area Monitors. This technology provides continuous sampling of DHP levels (0.0 ppm-20 ppm) in the study area with data logger functions. An LED display provides a continuous reading of hydrogen peroxide levels to 0.1 ppm resolution with a loud alarm horn to alert in the event of exceeding 1.0 ppm. A remote repeater provides central monitoring (nurses station) of employed systems. Preferably, an Interscan 4000 Series Hydrogen Peroxide ($H_2O_2$) Gas Analyzer can be employed (Interscan Corporation, California). Interscan 4000 series devices such as the 4090-1999b can detect a range between 0 and 1999 ppb with a resolution of 1 ppb. Even more preferably, DHP can be measured using a Picarro PI2114 Gas Concentration Analyzer (Picarro, Inc., California) measures hydrogen peroxide levels as low as 3 ppb.

The Draeger X-am 5100 provides continuous sampling of ambient hydrogen peroxide levels and is designed as a personal protection monitor to be worn. The capability provides continuous sampling of DHP levels (0.5 ppm-20 ppm), can be worn by staff, and has data logger functions. Intuitive LED display provides a continuous reading of hydrogen peroxide levels to 0.1 ppm resolution with a loud alarm horn to alert in the event of exceeding 1.0 ppm.

Three Steri-Trac monitors with remotes provide coverage with representative samples of the treated area. Additional, periodic samples of the treated area are achieved with the X-am 5100 personal monitor. Combined, this sampling method provided fixed and mobile continuous sampling of the entire treated area and effectively mitigated risk of exceeding exposure thresholds. Levels exceeding 1.0 ppm, the safety threshold, are never observed during the study period.

The sampling conducted in Phases I and II are tabulated below in Table 1.

TABLE 1

Samples cultured from high-touch/high-use surfaces in the hospital

| | Areas | Samples | Time Points | Total |
|---|---|---|---|---|
| Rooms | 3 | 13 | 5 | 195 |

Phase III—Reduction of Healthcare Acquired Infections

Phase III assesses the ability of DHP technology to reduce HAIs over time. HAI rates observed in the CV-Tele study area over a six-month period are compared to the rates observed during the same six-month window in the previous year. The number and types of infections are recorded, as well as the responsible pathogenic organism.

A significant reduction in microbial colonization is observed over seven days after implementation of the DHP technology on the CV-Tele unit. Complete eradication of *Staphylococcus aureus, Candida parapsilosis, Pseudomonas putida, Flavobacterium meningosepticum, Pseudomonas picketti,* and *Citrobacter* is observed at 7 days. A reduction in colony counts of Alcalagines of 68%, *Pseudomonas aeruginosa* of 95%, and *Enterobacter* of 50% is seen from the time of terminal cleaning to 7 seven days. The culture results are shown in Table 2 below.

A reduction in the infection rate occurring on the CV-Tele unit is observed in the study period versus the same six-month period in the prior year. During the study period, a total of three infections are observed versus eight infections during the previous year. This represents a reduction in the observed infection rate of 62.5%. When calculated per patient hospital day, the infection rate decreased from 0.18 infection/day to 0.07 infection/day. During the study period, one gastrointestinal infection due to *Escherichia coli*, one gastrointestinal infection due to *Clostridium difficile*, and one case of pneumonia due to *Escherichia coli* and *Haemophilus* influenza are observed. The monthly infection rates are provided in Table 3. A plot of the infection rates is shown in FIG. 1.

Example 3: VA Hospital Community Living Center Sampling

High touch surfaces in both treatment areas and control areas are identified and an equal number of equivalent locations selected for study. Specific rooms for survey are selected by convenience as well as new admissions with or without documented MRSA and/or *C. diff* infections upon admission. This approach has been validated in previous studies on UV and is consistent with real-world hospital settings. Significantly, the installation and testing of DHP units occurs without disruption, or change, to the existing anti-microbial and infection reduction protocols and methods.

TABLE 2

Measured Colony Forming Units

| Microbe | CFU Count | | | Pre-Cleaning to 187 hour Reduction (%) | Post-Cleaning to 187 hour Reduction (%) |
| --- | --- | --- | --- | --- | --- |
| | Pre-Cleaning | Post-Cleaning | 187 Hours | | |
| *S. Aureus* | 8 | 0 | 0 | 100% | NA |
| *Alcaligenes xylosoxidans* | 29 | 28 | 9 | 69% | 68% |
| Mold | 28 | 15 | 21 | 25% | −40%* |
| *Candida parapsilosis* | 3 | 1 | 0 | 100% | 100% |
| *Pseudomonas aeruginosa* | 25 | 20 | 1 | 96% | 95% |
| *Enterobacter* | 0 | 2 | 1 | NA | 50% |
| *Pseudomonas putida* | 2 | 0 | 0 | 100% | 100% |
| *Flavobacterium Meningosepticum* | 3 | 0 | 0 | 100% | 100% |
| *Pseudomonas picketti* | 4 | 0 | 0 | 100% | 100% |
| *Citrobacter* | 23 | 11 | 0 | 100% | 100% |
| *Corynebacteria* | 0 | 9 | 0 | NA | 100% |

*Source of *Candida* contamination was a faucet aerator that was continuously moist.

TABLE 3

Month by month infection rates

| Year-Month | Infection Rate |
| --- | --- |
| 2013 January | 0.34 |
| 2013 February | 0.13 |
| 2013 March | 0 |
| 2013 April | 0.13 |
| 2013 May | 0.13 |
| 2013 June | 0.27 |
| 2013 July | 0 |
| 2013 August | 0.25 |
| 2013 September | 0.14 |
| 2013 October | 0.26 |
| 2013 November | 0.15 |
| 2013 Decemeber | 0.27 |
| 2014 January | 0.13 |
| 2014 February | 0 |
| 2014 March | 0 |
| 2014 April | 0 |
| 2014 May | 0.32 |
| 2014 June | 0.14 |
| 2014 July | 0.27 |
| 2014 August (DHP treated) | 0 |
| 2014 September (DHP treated) | 0.15 |
| 2014 October (DHP treated) | 0.16 |
| 2014 November (DHP treated) | 0 |
| 2014 December (DHP treated) | 0 |
| 2015 January (DHP treated) | 0 |

Microbial reduction is tested by counts of aerobic bacterial colonies (ABC), MRSA, and *C. diff* n surface samples taken from intervention and control patient rooms. For both control and DHP testing areas, each of 10 rooms are sampled at five (5) high-touch surfaces including bed rails on both sides of the bed (surfaces #1 & 2), head and footboard railing (surface #3), tray table (surface #4), and bathroom sink (surface #5). Baseline measurements are collected weekly for twelve (12) weeks on each of the 5 selected surfaces. Following DHP installation, there are ten (10) intervention rooms (samples per room type—ABC, MRSA, *C. diff*) and ten (10) control rooms.

Samples are collected using Rodac press plates utilizing roll plate methods. TSA plates with Tween 80, specialized selective media in Rodac plates are utilized for MRSA and *C. diff*. Samples are collected during weeks three (3) to twelve (12) of each study period. A two week delay is provided before sampling to allow for the conditioning phase and for the atmospheric conditions in the room to normalize before or after DHP installation (e.g. Depending on the environment, DHP levels take time to stabilize as existing 'sinks' such as VOCs react with and use of the DHP produced.

Example 4: Study Design a. Data Collection

A randomized crossover study design is employed to determine bioburden levels of high-touch surfaces in presence of a continuous disinfectant (DHP) at a community living center health care facility. Current intermittent strategies to reduce HAIs such as cleaning, handwashing and other interventions are expected to proceed uninterrupted.

Four study periods are provided. First, a 14 week pre-installation period assesses the baseline bioburden level in two areas of the facility (Area A and Area B). In the second phase, one of the two areas is randomly assigned for installation of DHP devices while the second area serves as a control. The second phase lasts 14 weeks. In the third phase, a 14 week "washout period" where neither Area A nor Area B receive DHP treatment. In the final phase, the treated and non-treated areas are switched and further testing of DHP treated and control areas is performed.

The total number of sample collected is indicated in Table 1.

|  | DHP treated | | | Control | | | |
| --- | --- | --- | --- | --- | --- | --- | --- |
| Period | ABC | MRSA | C. Diff. | ABC | MRSA | C diff. | Total |
| 1 | 600 | 600 | 600 | 600 | 600 | 600 | 3600 |
| 2 | 600 | 600 | 600 | 600 | 600 | 600 | 3600 |
| 3 | 600 | 600 | 600 | 600 | 600 | 600 | 3600 |
| 4 | 600 | 600 | 600 | 600 | 600 | 600 | 3600 |
| Total | 2400 | 2400 | 2400 | 2400 | 2400 | 2400 | 14400 | b. Data Analyses

A mixed effects regression model is used to detect the difference in ABC counts and number of MRSA samples for the treatment rooms compared to the control rooms in the post-intervention period. The regression models will be specified as:

$$\text{Outcome} \sim \beta 0 + \beta 1 * \text{Group} + \beta 2 * \text{Period} + \beta 3 * \text{Group} * \text{Period} + Ui\gamma i$$

Where Group=treatment or control group, Period=pre or post-intervention period, and $Ui\gamma i$ is a random intercept for the room. A random intercept is used to account for repeated sampling from the same room. The parameter estimate for the interaction effect ($\beta 3$) shows the difference in the outcome for the treatment group compared to the control group in the post-intervention period. For ABC, a negative binomial mixed regression model is used to model the colony counts. For MRSA, a logistic mixed regression model is used to model the number of samples with MRSA present vs absent. All analysis are performed in R version 3.5.1.

c. Power Analyses

Power analyses for the mixed effects models are performed via simulation in R version 3.5.1 using the packages 'simstudy', 'glmmADMB', and 'lme4'. For ABC, a negative binomial distribution with mean of 68 and dispersion parameter of 1.5 is employed. Using the distribution, ABC counts are modeled for controls and pre-intervention assuming a 50% reduction in the post-intervention treatment group. Ten (10) treatment rooms and ten (10) control rooms with twelve (12) samples pre-intervention and twelve (12) samples post-intervention (480 samples per surface) for each room for each surface gives an 85% power to detect a 50% reduction in ABC counts, assuming this reduction occurs within the first sample after installation of the HP system.

For MRSA, it is assumed that 14% of samples in control and pre-intervention rooms detect MRSA based on other studies. Assuming a 50% reduction on post-intervention control rooms, ten (10) treatment rooms and ten (10) control rooms with twelve (12) samples pre-intervention and twelve (12) samples post-intervention (480 samples) for each room for five (5) surfaces combined (480*5=2,400 total samples) gives an 83% power to detect a 50% reduction in MRSA samples, assuming this reduction occurs within the first sample after installation of the DHP system.

Example 5: Application of DHP to Reduce Microbial Bioburden in an Active Healthcare Setting a. Sample and Setting Between March 2019 and May 2019 at a 762-bed acute care facility, an Institutional Review Board approved study is performed. At total of five units of the facility are studied: a 24-bed pediatric intensive care unit (PICU), 22-bed pediatric emergency department (Peds ED) unit, a 23-bed adult oncology services (AOS) unit, 22-bed adult intensive care unit-cardiovascular trauma unit (CVTU), and 10-bed adult trauma surgical intensive care unit (TSICU). DHP units (Synexis™ BLADE, Lenexa, Kans.) are installed in the respective intervention location's HVAC system at the diffuser level by Synexis. The units utilize ambient humidity and oxygen moving through the HVAC system along with a patented plasma separation process to generate hydrogen peroxide in a non-aqueous, dry gas form at a range of 5 to 25 parts per billion (ppb) with transient concentrations as high as 40 ppb. The DHP units are operated continuously (24-hours per day, 7-days per week) throughout the study period in the four intervention units. The fifth intervention unit (TSICU) did not have the system directly installed in the location, however the HVAC is shared between the TSICU and CVTU allowing for exposure to the DHP.

The effect of the DHP systems is assessed by comparing baseline surface microbial sampling pre-DHP implementation (study days −3, −2, −1) to post-implementation sampling (study days 1, 7, and 28). All microbial sampling (Table 4) is performed by Controlled Environmental Management, Fountain Hills, AZ. after the hospital's standard manual cleaning is performed in each location. No other changes in the hospital's environmental cleaning and disinfection protocols or practices is made during the study period.

TABLE 4

Department Location and Bed Counts and Sample Counts Collected

| Department Name | Number of Beds in Unit | Samples Collected |
| --- | --- | --- |
| Pediatric Emergency (Peds ED) | 22 | 7 per day |
| Adult Oncology Services (AOS) | 23 | 10 per day |
| Adult Cardiovascular Trauma Intensive Care Services (CVTU) | 22 | 7 per day |
| Adult Trauma Surgical Intensive Care (TSICU) | 10 | 7 per day |
| Pediatric Unit (PICU) | 24 | 7 per day |

Surface samples are obtained using pre-moistened blue-cap swabs from curtains, bed rails, and counters in each location collected from an area of 25 $cm^2$ by vigorous swabbing in a horizontal and then a vertical direction. The curtain collection location is at the grab location of approximately four feet from the ground, starting at the edge of the curtain. The bed rail sample is collected from the inner and upper portion of the bedrail at approximately 2-3 feet from the top of the bed, which is closest to where the call button resides. The counter specimens for patient rooms are only collected in the pediatric emergency room as this location does not have stationary beds. The counter specimens are collected in random locations on those surfaces. A final specimen type is collected above the proximity cabinet in the adult oncology patient units in an area that would possibly be missed during daily cleaning. Nurse station counter samples are collected closest to where the charge nurse computer station is located on the visitor side.

Figure 2:
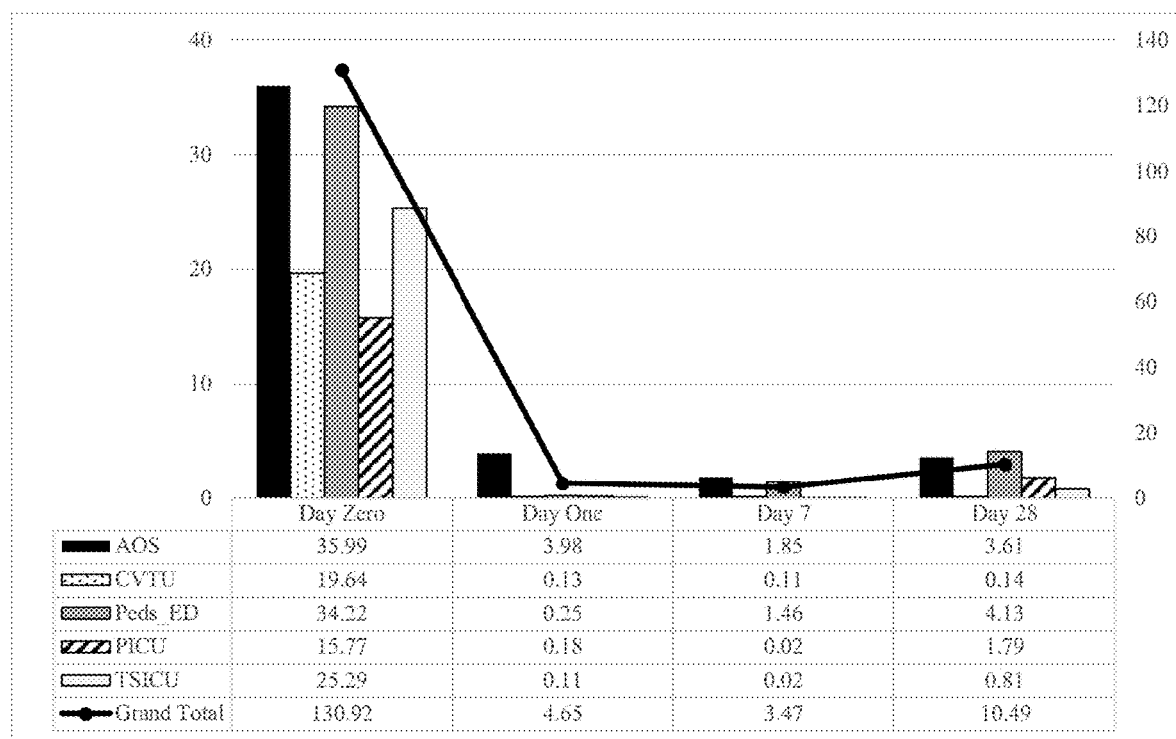
FIG. 2 is plot of the colony forming units (CFU) by unit and sample day.

A three-day window before initiation of the DHP is used to establish the Day Zero baseline. The individual department with the highest reduction in microbe presence is AOS, with a total reduction of 32.0 million CFU from Day Zero to Day One post-implementation. Similarly, by day 28 post-implementation, the reduction is equal to 32.4 million CFU. The overall reduction is 126.3 million CFU after one day of implementation and maintained at 120.4 million CFU at Day 28 post-implementation with all units included, as seen in FIG. 2.

Figure 3:
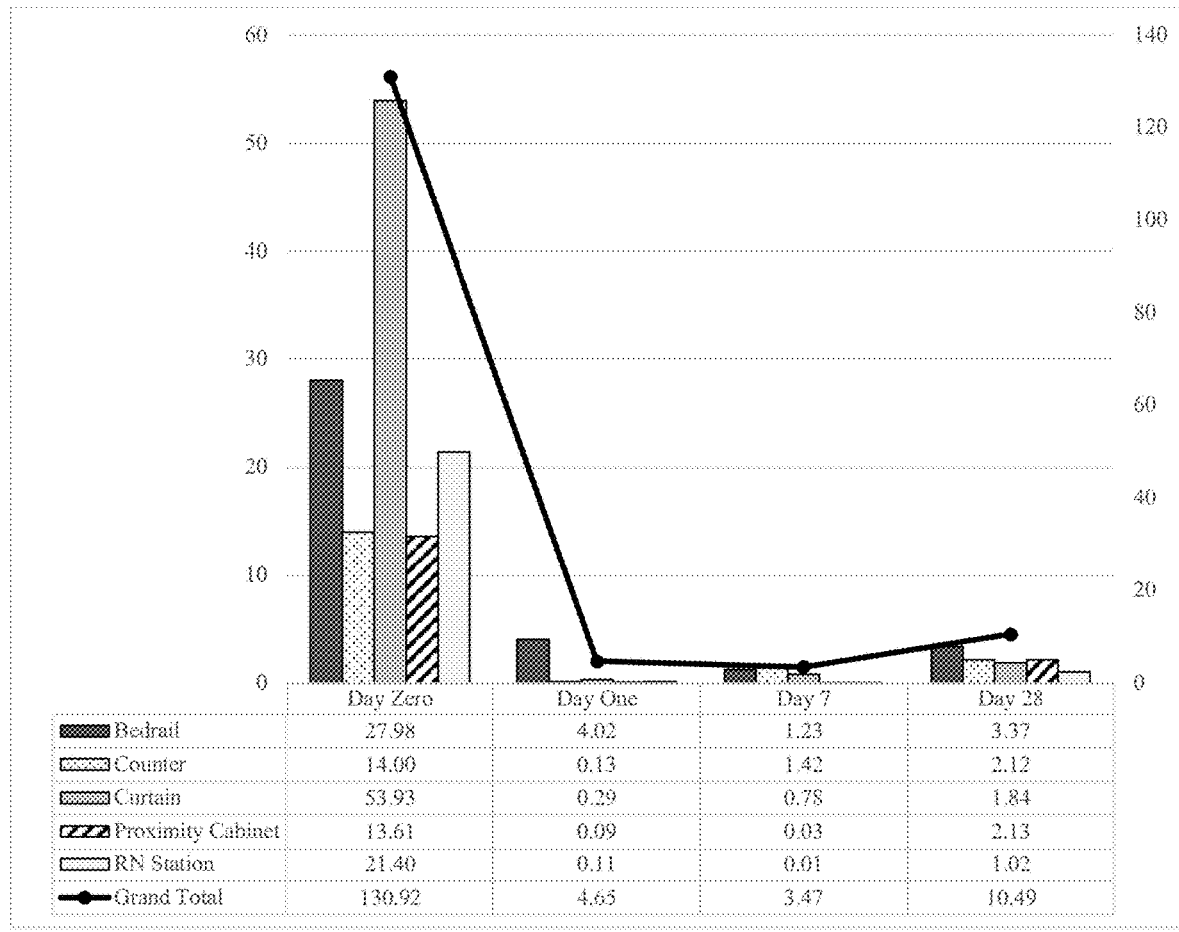
FIG. 3 is a plot of microbial counts (CFU) by surface type by sample day.

CFU reductions were found in both hard and soft surfaces (FIG. 3). The soft surfaces realized the most substantial reduction with a 53.6 million CFU decrease within the first day of implementation and maintained a reduction of 52.1 million CFU reduction by day 28. The second highest reduction was the bedrails with a decrease of 23.9 million CFU at day one, which was maintained at a 24.6 million CFU decrease at day 28.

There was a statistically significant difference in mean microbial surface counts ($t_{43.324}=9.396$, $p<0.001$) between Day Zero and Post Day One. The average microbial count on post Day One was 3.32 million CFU lower than the Day Zero count. By Day 28, there was a continued statistically significant difference in mean microbial counts ($t_{39.843}=9.165$, $p<0.001$). The average microbial count on Day 28 was 3.16 million CFU lower than the Day Zero count.

The predominant organisms recovered from the sampled surfaces are listed in Table 5 and document the recovery of normal skin flora and potential microbial pathogens. DHP was effective in the reduction of predominant Gram-Negative Rod for all three time periods. *Acinetobacter lwoffii* was found as a primary organism in fewer specimens for Day 7. The rest of the samples did not demonstrate a change in the primary organism rank for sample surfaces.

TABLE 5

Top Five Surface Organisms by Number of Samples with Organism Ranked as Primary Organism Identified in Specimen

| | | Number of Samples with Org as 1$^{st}$ Ranked Org | | | |
|---|---|---|---|---|---|
| Rank | Surface | Day Zero | Day 1 | Day 7 | Day 28 |
| 1 | Coag Negative *Staph* | 4 | 11 | 8 | 16 |
| 2 | Unidentifiable Gram-negative Rod | 9 | 2 | 3 | 5 |
| 3 | *Micrococcus/Kocuria* | 4 | 5 | 6 | 13 |
| 4 | *Bacillus* | 4 | 1 | 6 | 9 |
| 5 | *Acinetobacter lwoffii* | 3 | 7 | 2 | 4 | b. Air Samples

All air sampling is conducted using a bioaerosol sampling pump (Buck Bio-Culture™, A.P. Buck Inc, Orlando, FL.) with a total sample volume of 500 liters each. A total of 48 air samples are collected from the middle of each nursing station of each patient care unit. Additional samples are collected in the Adult Oncology services hallway, outside the Pediatric Emergency room hallway, and a final sample taken in the ambulance bay main Emergency Room Entrance as a baseline. The non-nursing air samples are chosen to determine a comparison of locations without the DHP installed to locations with the DHP installed. Each sample consisted of two settle plates, including one with trypticase soy agar (TSA) and one with inhibitory mold agar (IMA).

There was a statistically significant difference in mean microbial air sample counts ($t_{13}=2.704$, $p=0.018$). The average microbial count on Day 1 was 26.800 CFU lower than the Day Zero CFU count. By Day 7, there was no statistically significant difference in mean microbial counts ($t_{13}=1.563$, $p=0.142$). The average microbial count on Day 7 was 18.600 CFU lower than the Day Zero CFU count. By Day 28, there was again, a statistically significant difference in mean microbial counts ($t_{13}=2.434$, $p=0.030$). The average microbial count on Day 28 was 25.200 CFU lower than the Day Zero CFU count.

The identification of organisms from specimens is conducted and ranked for each specimen by growth amount. The primary organism is ranked as the organism with the highest growth in CFU. The top five identified airborne organisms are listed in Table 6 and show normal skin flora, bacteria and pathogens. DHP results in a reduction for primary organism identification for Gram-Negative Rod, *Micrococcus*, and *Bacillus* on Day One. By Day 7, a reduction is found in *Enterococcus faecalis* and Coagulase Negative Staph. Notably, the levels of all the organisms are vastly decreased from baseline counts in the millions. No pattern emerges among the first ranked organisms at each site. At Day 7, the counts were much lower, but since *micrococcus* is very common, the counts in the low hundreds are the greatest at more sample sites then than during baseline. Thus, while there is a huge decrease in *micrococcus* (and other organisms,) its widespread presence makes it the most common residual organism.

TABLE 6

Top Five Organisms by Number of Air Samples with Organism Ranked as Primary Organism Identified in Specimen

| | | Number of Samples with Org as 1$^{st}$ Ranked Org | | | |
|---|---|---|---|---|---|
| Rank | Surface | Day Zero | Day 1 | Day 7 | Day 28 |
| 1 | *Micrococcus/Kocuria* | 4 | 1 | 6 | 8 |
| 2 | Coag Negative *Staph*. | 2 | 8 | 2 | 8 |
| 3 | *Bacillus* | 2 | 1 | 0 | 5 |
| 4 | Unidentifiable Gram-negative Rod | 2 | 0 | 0 | 1 |
| 5 | *Enterococcus facaelis* | 1 | 2 | 0 | 0 | c. Specimen Processing

All specimens are transported to U.S. Micro Solutions, Inc. via overnight shipping, ensuring temperature is maintained by using insulated cold packed shipping boxes. The surface samples are plated to blood agar plates and incubated at 20-25 degrees Celsius for five days, then total colony forming units (CFU) counts are determined. Species identification is conducted based on selected isolates and identified for epidemiologically important organisms. Air sampling is completed on TSA incubated at 20-25 degrees Celsius for five days. Species identification for *S. aureus*, *Enterococcus*, and gram-negative bacilli are completed using MALDI-TOF mass spectrometry with genus identification for all other organisms.

TABLE 7

Aggregated Surface Swab Data Analysis

| Swab Location | Day −3 | Day −2 | Day −1 | Median Baseline | Day 1 | Day 7 | Day 28 | Day 60 |
|---|---|---|---|---|---|---|---|---|
| AOS RN Station | >10,000,000 | >1,000,000 | 50 | >10,000,000 | 78,000 | 250 | 11,000 | 900 |
| AOS PT Room 1 Curtain | 88,000 | >10,000,000 | 1670 | 88,000 | 790 | 19,300 | 450,000 | 12,000 |
| AOS PT Room 1 Bedrail | 290,000 | >1,000,000 | 3380 | 290,000 | 900 | >1,000,000 | >1,000,000 | 11,700 |
| AOS PT Room 2 Curtain | >1,000,000 | >10,000,000 | 320,000 | >1,000,000 | 8100 | 680,000 | 7800 | 2500 |
| AOS PT Room 2 Bedrail | >10,000,000 | >1,000,000 | >100,000 | >1,000,000 | 20 | 120,000 | 3600 | 3700 |
| AOS PT Room 3 Curtain | >1,000,000 | >10,000,000 | 340,000 | >1,000,000 | 740 | 80 | 2600 | 600 |
| AOS PT Room 3 Bedrail | >10,000,000 | >1,000,000 | 1500 | >1,000,000 | 3,800,000 | 2500 | 1550 | 700 |
| AOS Median | >1,000,000 | >1,000,000 | 3380 | >1,000,000 | 900 | 19,300 | 7800 | 2500 |
| AOS Mean | ~X*10^6 | ~X*10^6 | ~X*10^5 | | 555,507 | >260,304 | >210,929 | 4586 |
| PEDS ER RN Station | >10,000,000 | >10,000,000 | 4000 | >10,000,000 | 1290 | 110 | >1,000,000 | 400 |
| PEDS ER Rm 1 Curtain | >10,000,000 | >10,000,000 | 49,000 | >10,000,000 | 40,000 | 5600 | >1,000,000 | 1900 |
| PEDS ED Rm 1 Counter | >10,000,000 | >10,000,000 | 170 | >10,000,000 | 102,000 | 21,800 | >1,000,000 | 20,000 |
| PEDS ER Rm 2 Curtain | >1,000,000 | >10,000,000 | 110,000 | >1,000,000 | 70,000 | 28,100 | 3400 | 2300 |
| PEDS ED Rm 2 Counter | >10,000,000 | >10,000,000 | <10 | >1,000,000 | 15,000 | 490 | 118,000 | 1700 |
| PEDS ED Rm 3 Curtain | 1,300,000 | 8,200,000 | 30 | 1,300,000 | 9300 | 1340 | 11,500 | 540,000 |
| PEDS ED Rm 3 Counter | >10,000,000 | >1,000,000 | 430 | >1,000,000 | 16,000 | 1,400,000 | >1,000,000 | 80,000 |
| PEDS ER Median | >10,000,000 | >10,000,000 | 430 | >1,000,000 | 16,000 | 5600 | >1,000,000 | 2300 |
| PEDS ER Mean | ~X*10^6 | ~X*10^6 | 23,377 | | 36,227 | 208,206 | >590,414 | 92,329 |
| PICU RN Station | >10,000,000 | >10,000,000 | >1,000,000 | >10,000,000 | 26,000 | 6200 | 1510 | <100 |
| PICU Rm 1 Curtain | 154,000 | 760,000 | 220 | 154,000 | 140 | 90 | 62,000 | 300 |
| PICU Rm 1 Bedrail | 49,000 | 310,000 | 70,000 | 70,000 | 2020 | 20 | >1,000,000 | <100 |
| PICU Rm 2 Curtain | 670,000 | >100,000 | >1,000,000 | 670,000 | 150 | 1200 | 1000 | <100 |
| PICU Rm 2 Bedrail | >1,000,000 | >10,000,000 | 200,000 | >1,000,000 | 141,000 | 3900 | 690,000 | 120,000 |
| PICU Rm 3 Curtain | 910,000 | >10,000,000 | 350 | 910,000 | 240 | 12,800 | 31,000 | 110,000 |
| PICU Rm 3 Bedrail | 390 | 90,000 | >1,000,000 | 90,000 | 6300 | 770 | 9000 | <100 |
| PICU Median | 670,000 | 760,000 | 200,000 | 670,000 | 2020 | 1200 | 31,000 | <100 |
| PICU Mean | ~X*10^6 | ~X*10^6 | ~X*10^5 | | 25,121 | 3,569 | >256,359 | 32,950 |
| CVTU RN Station | >1,000,000 | >100,000 | 8000 | >100,000 | 6000 | 510 | 820 | 2100 |
| CVTU PT Room 1 Curtain | 880,000 | >10,000,000 | 136,000 | 880,000 | 310 | 15,400 | 17,000 | 200 |
| CVTU PT Room 1 Bedrail | >100,000 | >10,000,000 | 850 | >100,000 | 23,000 | 1810 | 11,300 | 15,800 |
| CVTU PT Room 2 Curtain | 690,000 | >10,000,000 | >1,000,000 | >1,000,000 | 94,000 | 40 | 80 | 600 |

TABLE 7-continued

Aggregated Surface Swab Data Analysis

| Swab Location | Day −3 | Day −2 | Day −1 | Median Baseline | Day 1 | Day 7 | Day 28 | Day 60 |
|---|---|---|---|---|---|---|---|---|
| CVTU PT Room 2 Bedrail | >1,000,000 | >10,000,000 | >1,000,000 | >1,000,000 | 60 | 93,000 | 2700 | <100 |
| CVTU PT Room 3 Curtain | >1,000,000 | >10,000,000 | 240 | >1,000,000 | 670 | 1300 | 104,000 | 900 |
| CVTU PT Room 3 Bedrail | >1,000,000 | >1,000,000 | 190 | >1,000,000 | 3100 | 170 | 1130 | 200 |
| CVTU Median | >1,000,000 | >1,000,000 | 8000 | >1,000,000 | 3100 | 1300 | 2700 | 600 |
| CVTU Mean | ~X*10^5 | ~X*10^6 | ~X*10^5 | | 18,163 | 16,033 | 19,576 | 2,839 |
| Overall Median | >1,000,000 | >10,000,000 | 6000 | >1,000,000 | 6150 | 2155 | 11,400 | 1300 |
| Overall Mean | ~X*10^6 | ~X*10^6 | ~X*10^5 | | 158,755 | >122,028 | >269,319 | 33,173 |
| Key: | Zero log or increase | | 1 or 2-log kill | | 3 or 4-log kill | | 5-log kill or greater | | d. Statistical Analysis

Total surface and air sample CFU data are analyzed using a paired t test. For all data, an average of the baseline surface samples (study days −3, −2, −1) is used as the comparative point for analysis. Statistical analysis is performed using IBM SPSS statistics version 25. A p-value of less than or equal to 0.05 is considered significant.

The bacterial count results are collated and organized by location and hospital ward, and the median baseline count for each sample location is found FIG. 2). The log reductions are then observed, with a log reduction being defined as a decrease in bacterial count by an order of magnitude of 10 (i.e., 100,000 CFU to 10,000 CFU is a 1 log reduction). The overall mean baseline count is greater than 1,000,000 Colony Forming Units (CFU), as is the overall median baseline count. This number is consistent with three of the four hospital units, with the only exception being the Pediatric Intensive Care Unit (PICU), which has a median baseline count of 670,000 CFU during the three days of pre-intervention testing over the seven locations in the unit. The overall median count decreases after installation through Day 7 (>122,028 CFU), then rises slightly at Day 28 (>269,319 CFU), but then decreases to the lowest level at Day 60 (33,173 CFU), which results in a 2 log reduction from the median baseline. The unit that achieves the highest magnitude of reduction compared to the median baseline is Adult Oncology Services, which drops from greater than 1,000,000 CFU to 4,586 CFU in 60 days, a 3 log-reduction. The reductions are also observed based on the type of location that is sampled. Two of the four nurses' stations that are sampled achieve at least a 5 log reduction rate over 60 days, with the other two reducing by 4 and 2 logs. 75% (9/12) curtains that are tested achieve at least a 3 log reduction after 60 days, and 66.67% (8/12) hard surfaces (bedrails/counters) that are tested achieve at least a 3 log reduction as well.

The bacterial counts undergo a natural log transformation, and a multiple linear regression model is created with the natural log of the counts as the dependent variable (Table 8). The median baseline count is denoted as Day 0 to account for the pre-intervention baseline counts in order to eliminate the impact of the high variance in the baseline counts on the regression model. The main independent variable of interest in the model is time, measured in days. Covariates that are included and controlled for in the model include hospital unit and location type, both as categorical variables. Time is found to be a significant predictor of bacterial count with a p-value of 0.00011 (Table 9), indicating that the activation of the Dry Hydrogen Peroxide significantly impacted the level of bioburden in the four units of the hospital in which it is installed over the two month study. Qualitative accounts from the nurses on staff included the observation that in the Pediatric Intensive Care Unit (PICU), that a gasoline smell from the helicopter pad on the roof directly above could routinely be smelled before the installation of DHP, but that after the installation, the smell is not detectable. This indicates that DHP is able to break down airborne volatile organic compounds (VOCs) in real world, occupied settings. During the study, there are no instances of complaints by patients in the treated rooms that are consistent with symptoms commonly associated with overexposure to hydrogen peroxide, which include eye, nose, and throat irritation.

Another pattern is noted during the collation and subsequent analysis of the data regarding the type of surface that is swabbed and the reduction rates observed within the first day after activation of the DHP system. The reduction rates of soft surfaces (curtains) in patient rooms compared to hard surfaces (counter/bedrail) are analyzed, and 67% (8/12) of the curtains that are sampled experienced at least a 3 log reduction in microbial load compared to 33% (4/12) of the hard surfaces in the same patient rooms. This discrepancy is only noted during the first day after installation, but it is included during the subsequent analysis.

TABLE 8

Regression model parameters

| Source | SS | Df | MS | |
|---|---|---|---|---|
| Model | 283.312487 | 6 | 47.2187478 | Number of obs = 140 |
| Residual | 1291.33739 | 133 | 9.70930369 | F(6, 133) = 4.86 |
| Total | 1574.64988 | 139 | 11.3284164 | Prob > F = 0.0002 |
| | | | | R-squared = 0.1799 |
| | | | | Adj R-squared = 0.1429 |
| | | | | Root MSE = 3.116 |

TABLE 9

Stata Output of Multiple Linear Regression Model of the Log-transformed Bacterial Counts over Time, controlling for Location Type and Hospital Unit

| LNCount | Coef. | Std. Err | t | P > |t| | [95% Conf. Interval] |
|---|---|---|---|---|---|
| Time | −.0461318 | 0.0115691 | −3.99 | 0.000 | −0.069015 to −0.0232486 |
| Location | | | | | |
| 2 | 0.7845767 | 0.8045414 | 0.98 | 0.331 | −0.8067751 to 2.375928 |
| 3 | 0.2099099 | 0.8045414 | 0.26 | 0.795 | −1.381442 to 1.801262 |
| Unit | | | | | |
| 2 | −1.191425 | 0.7448606 | −1.60 | 0.112 | −2.66473 to 0.2818808 |
| 3 | 1.152086 | 0.7448606 | 1.55 | 0.124 | −.3212195 to 2.625391 |
| 4 | −0.8563779 | 0.7448606 | −1.15 | 0.252 | −2.329683 to 0.6169276 |
| _cons | 10.20476 | 0.8618942 | 11.84 | 0.000 | 8.49997 to 11.90956 |

DHP resulted in an overall 96.5% CFU microbial reduction, 130.92 million CFU on Day Zero to 4.65 million CFU on Day One in all areas and sampled surfaces. However, the greatest reduction in microbial burden was observed on the most difficult surface for maintaining cleanliness, the curtains documented reduction of 99.5% from 53.93 million CFU on Day Zero to 0.29 million CFU on Day One. No increase in staff cleaning or housekeeping was implemented, nor were any curtain changes implemented during this period.

Example 6: Application of DHP to Reduce Hospital Acquired Infections an Active Healthcare Setting Hospital acquired infections (HAIs) are routinely monitored in active healthcare settings. The HAI data from the acute care facility of Example 5 were monitored after installation of DHP generating devices and compared to an equivalent period prior to the installation and treatment. The dates, patient age, type of infection and date of discovery of the infection are presented in Table 10.

TABLE 10

Hospital Aquired Infections Pre- and Post-Treatment

| | Patient Age | Infection | Infection Discovery date |
|---|---|---|---|
| | | 2019 | |
| January | 1 | NM | Jan. 4, 2019 |
| | 16 | Tube-related urinary infection | Jan. 31, 2019 |
| February | 9 | Urinary Tract Infection (UTI) | Feb. 5, 2019 |
| | 8 | Gastroenteritis | Feb. 10, 2019 |
| | 1 | Surgical site infection (SSI) | Feb. 12, 2019 |
| | 15 | Central Line-Associated Bloodstream Infection (CLABSI) | Feb. 27, 2019 |
| March | 8 | Bacteremia | Mar. 7, 2019 |
| | 2 | Gastroenteritis | Mar. 11, 2019 |
| | 17 | NM | Mar. 23, 2019 |
| | 4 | NM | Mar. 31, 2019 |
| April | 13 | ITU | Apr. 1, 2019 |
| | 1 | NM | Apr. 1, 2019 |
| | 1 | Gastroenteritis | Apr. 5, 2019 |
| | 6 | CLABSI | Apr. 11, 2019 |
| | 1 | CLABSI | Apr. 13 2019 |
| | 6 | NM | Apr. 14, 2019 |
| | 6 | Gastroenteritis | Apr. 25, 2019 |
| | 1 | NM | Apr. 25, 2019 |
| | 16 | CLABSI | Apr. 28, 2019 |
| | 3 | Bacteremia | 28/04/25019 |
| May | 14 | NM | May 2, 2019 |
| | 8 | NM | May 5, 2019 |
| | 2 | Surgical site infection (SSI) | May 17, 2019 |

TABLE 10-continued

Hospital Aquired Infections Pre- and Post-Treatment

| | Patient Age | Infection | Infection Discovery date |
|---|---|---|---|
| | 4 | CLABSI | May 25, 2019 |
| | 4 | NM | May 30, 2019 |
| June | 5 m | Gastroenteritis | Jun. 20, 2019 |
| July | 3 | Cellulitis | Jul. 8, 2019 |
| | 12 | Gastroenteritis | Jul. 11, 2019 |
| | 2 | Gastroenteritis | Jul. 27, 2019 |
| August | 9 | Gastroenteritis | Aug. 14, 2019 |
| | 17 | Gastroenteritis | Aug. 28, 2019 |
| September | 13 | Pneumonia | Sep. 14, 2019 |
| | 15 | Bacteremia | Sep. 29, 2019 |
| | 18 | Gastroenteritis | Sep. 29, 2019 |
| October | 3 | CLABSI | Oct. 5, 2019 |
| | 5 | Gastroenteritis | Oct. 22, 2019 |
| | 15 | Soft tissue infection | Oct. 28, 2019 |
| November | 8 | Clinical pneumonia | Nov. 3, 2019 |
| December | 17 | Gastroenteritis | Dec. 18, 2019 |
| | 3 | ITU | Dec. 26, 2019 |
| | | 2020 | |
| January | 3 | Clinical pneumonia | Jan. 1, 2020 |
| | 2 | Viral pneumonia (Rinovirus) | Jan. 10, 2020 |
| | <1 | Gastroenteritis (Sapovirus) | Jan. 27, 2020 |
| February | 13 | Asymptomatic UTI (*E. Coli*) | Feb. 7, 2020 |
| | 9 | Bacteremia (*Pseudomonas aeruginosa*) | Feb. 16, 2020 |
| | <1 | CLABSI (*E. Coli*) | Feb. 17, 2020 |
| | 9 | Clinical pneumonia | Feb. 20, 2020 |
| | 6 | Clinical pneumonia | Feb. 27, 2020 |
| March | 6 | Soft tissue infection | Mar. 3, 2020 |
| | 6 | CLABSI (*Pseudomonas aeruginosa*) | Mar. 25, 2020 |
| April | 6 | CLABSI (*E. Coli*) | Apr. 13, 2020 |
| | 10 | Gastroenteritis (*Clostridium*) | Apr. 14, 2020 |
| | 10 | Asymptomatic UTI (*E. Coli*) | Apr. 26, 2020 |
| May | 10 | Pneumonia (Respiratory Syncytial Virus (RSV)) | May 5, 2020 |
| June | 17 | Bacteremia (*E. coli*) | Jun. 11, 2020 |
| July | 17 | CLABSI (*Klebsiella pneumoniae* MDR) | Jul. 16, 2020 |
| | 6 | Pneumonia (COVID-19) | Jul. 31, 2020 |

The distribution of types of infection pre- and post-treatment are presented in Table 11. As shown in Table 11, the total number of infections is reduced, with pneumonia and gastroenteritis exhibiting the greatest reduction. Given the relatively low numbers of infections, it remains an open question whether the distribution of infections is significantly affected pre- and post-treatment.

TABLE 11

Distribution of Types of Infections pre- and post-treatment

|  | Through July | | | |
|---|---|---|---|---|
| Type of Infection | 2019 Cases | Percent of Total Infections | 2020 Cases | Percent of Total Infections |
| Pneumonia | 9 | 31.03% | 6 | 35.29% |
| Gastroenteritis | 7 | 24.13% | 2 | 11.76% |
| Central Line Associated Bloodstream Infection (CLABSI) | 5 | 17.24% | 4 | 23.53% |
| Urinary Tract Infection (UTI) | 3 | 10.34% | 2 | 11.76% |
| Surgical Site Infection (SSI) | 2 | 6.90% | 0 | 0.00% |
| Bacteremia | 2 | 6.90% | 2 | 11.76% |
| Cellulitis | 1 | 3.45% | 0 | 0.00% |
| Soft Tissue Infection | 0 | 0.00% | 1 | 5.89% |
| Total | 29 | | 17 | |

The distribution of HAIs by age is presented in Table 12. Interestingly, the number of infections of the youngest patients (3 years old or younger) presents a 3 fold decline from 12 to 4. However, given the numbers, it remains to be determined whether HAI reductions DHP treatment is affected by age.

TABLE 12

Distribution of Infections by Age

| Patient Age (years) | 2019 | Percent of Infections | 2020 | Percent of Infections |
|---|---|---|---|---|
| 3 years old or younger | 12 | 41.38% | 4 | 23.53% |
| 4-6 years old | 6 | 20.69% | 5 | 29.41% |
| 7-9 years old | 4 | 13.79% | 2 | 11.76% |
| 10-12 years old | 1 | 3.45% | 3 | 17.65% |
| 13-15 years old | 3 | 10.34% | 1 | 5.88% |
| 16 years old or older | 3 | 10.34% | 2 | 11.76% |

As shown in Table 13, the application of DHP in active healthcare settings, without any additional changes to standard manual cleaning procedures, significantly reduces HAI infections by more than 40%. This reduction is both surprising and a significant improvement over conventional methods and could potentially enable substantial reductions in both costs and mortality. For example, in the U.S., a 40% reduction in HAIs could reduce the number of deaths by nearly 40,000 and the cost to US hospitals by $12 billion dollars. These reductions are considerably greater than any other reported reductions in HAIs using conventional approaches.

TABLE 13

Reduction of HAI Infections Pre- and Post-treatment

| Year | Number of Total Infections Through July | Number of Patients with Infections |
|---|---|---|
| 2019 | 29 | 24 |
| 2020 | 17 | 13 |
| | 41.38% reduction (incidence) | 45.83% reduction (incidence) |

The invention claimed is:

1. A method for microbial reduction in a healthcare facility, the method comprising:

(a) installing two or more Dry Hydrogen Peroxide (DHP) generating devices in a treatment area, wherein at least one DHP generating device is affixed to and/or incorporated within a heating, ventilation, and air conditioning (HVAC) system of the treatment area, and wherein each of the DHP generating devices comprises an air permeable catalyst coated mesh substrate;

(b) operating the DHP generating devices in a two-stage process to produce DHP molecules and direct the DHP molecules out of the devices and into the treatment area, wherein the residence time of the DHP molecules within each of the DHP generating devices is less than 1 second, wherein the two-stage process includes- (i) an initial conditioning phase for conditioning the treatment area with DHP, wherein during the initial conditioning phase, at least one of the following three conditions (Ai) to (Ci) is met—

(Ai) the relative humidity within the treatment area is at least 3% higher than the relative humidity in the treatment area measured just before the operating of step (b);

(Bi) the levels of volatile organic compounds (VOCs) in the treatment area are lower than the level of VOCs in the treatment area just before the operating of step (b) but are still measurable; and (Ci) the concentration of DHP within the environment is increasing or decreasing; and (ii) a maintenance phase for maintaining a steady-state equilibrium concentration of DHP in the treatment area, wherein during the maintenance phase, at least one of the following three conditions (Aii) to (Cii) are met—

(Aii) the relative humidity within the treatment area is approximately the same as the relative humidity in the treatment area measured just before the operating of step (b);

(Bii) the levels of VOCs in the treatment area are not detectable; and (Cii) the concentration of DHP in the treatment area is at steady-state, wherein the steady-state equilibrium concentration of DHP in the treatment area during the maintenance phase is between 1 part per billion by weight (ppb) and 5 ppb throughout at least 90% of the volume of the treatment area of the healthcare facility.

2. The method of claim 1, wherein the treatment area comprises at least one DHP generating device placed for each 110 to 185 square meters of area and a volume of between 275 and 460 cubic meters.

3. The method of claim 1, wherein the treatment area is isolated from surrounding space and HVAC systems.

4. The method of claim 1, wherein the treatment area comprises a single zone of an HVAC system.

5. The method of claim 4, further comprising at least three DHP generating devices, with one DHP generating device placed for each 110 to 185 square meters of area and a volume of between 275 and 460 cubic meters.

6. The method of claim 5, wherein each of the DHP generating devices are placed no more than 20 meters from another one of the DHP generating devices, and wherein the DHP generating devices are arranged to provide overlapping coverage zones.

7. A method for reducing nosocomial infections in a healthcare facility in need thereof, the method comprising:

operating two or more DHP generating devices in a two-stage process in at least one treatment area of the healthcare facility, wherein the operating includes producing DHP molecules within each of the DHP generating devices and directing the DHP molecules out of the devices and into the treatment area, wherein the residence time of the DHP molecules within each of the DHP generating devices is less than 1 second, wherein the two-stage process includes—
(i) an initial conditioning phase for conditioning the treatment area with DHP, wherein during the initial conditioning phase, at least one of the following three conditions (Ai) to (Ci) is met—
  (Ai) the relative humidity within the treatment area is at least 3% higher than the relative humidity in the treatment area measured just before the operating;
  (Bi) the levels of volatile organic compounds (VOCs) in the treatment area are lower than the level of VOCs in the treatment area just before the operating but are still measurable; and
  (Ci) the concentration of DHP within the environment is increasing or decreasing; and
(ii) a maintenance phase for maintaining an equilibrium concentration of DHP in the treatment area, wherein during the maintenance phase, at least one of the following three conditions (Aii) to (Cii) are met—
  (Aii) the relative humidity within the treatment area is approximately the same as the relative humidity in the treatment area measured just before the operating;
  (Bii) the levels of VOCs in the treatment area are not detectable; and
  (Cii) the concentration of DHP in the treatment area is at steady-state,
wherein the steady-state equilibrium concentration of DHP in the treatment area during the maintenance phase is between 1 part per billion (ppb) and 5 ppb throughout at least 90% of the volume of the treatment area of the healthcare facility,
wherein the nosocomial infection rates in the healthcare facility are reduced.

8. The method of claim 7, operating the DHP generating device in the maintenance phase continuously for at least 3 months,
wherein nosocomial infections of patients-at-risk are reduced by at least 25% measured on a 3 month window, and
wherein the treatment area comprises at least one chosen from a ward, an HVAC zone, or an air exchange restricted room.

9. The method of claim 7, wherein the treatment area is in a long-term care facility including a nursing home or a skilled nursing facility.

10. The method of claim 7, wherein the nosocomial infection is caused by a pathogen chosen vancomycin-resistant enterococci (VRE), Methicillin-resistant *Staphylococcus aureus*, multidrug resistant gram-negative bacteria (MDR GNB), aerobic bacterial colonies (ABC), or *Clostridium difficile*.

11. The method of claim 7, wherein during the maintenance phase, microbes are reduced by at least 70% on sampled surfaces to achieve reduced levels, and the reduced levels are maintained for at least 30 days.

12. The method of claim 11, wherein the sampled surfaces comprise high touch surfaces chosen from bed rails, head and footboard railing, tray tables, doorknobs, push-plates, handles, elevator buttons, switches, keyboards, mice, touch screens, blood pressure cuffs, privacy curtains, blinds, windowsills, furniture or bathroom sink.

13. The method of claim 12, wherein the nosocomial infections are reduced by at least 80%.

14. The method of claim 7, wherein the treatment area is chosen from an open plan ward, an intensive care unit (ICU), an oncology ward, a kidney dialysis unit, a neonatal ICU, or a pediatric ICU.

15. The method of claim 14, wherein the healthcare facility is chosen from a licensed hospital, a Licensed Ambulatory Surgical Center, Certified Mammography Services center, a certified rural health clinic, or an end stage renal dialysis center.

16. The method of claim 7, wherein the treatment area comprises a single zone of an heating, ventilation, and air conditioning (HVAC) system.

17. The method of claim 16, wherein the treatment area is maintained at a relative humidity of between 20 to 70%.

18. The method of claim 8, wherein the patients-at-risk are chosen from immunocompromised patients, neonatal patients, patients colonized but not infected, patient occupying rooms recently vacated by multidrug-resistant organism (MDRO)-positive patients, or kidney dialysis patients.

19. A method of reducing multidrug-resistant organisms (MDROs) on surfaces in a healthcare treatment area, the method comprising:
operating two or more Dry Hydrogen Peroxide (DHP) generating devices in a two-stage process to produce and distribute DHP in the treatment area, wherein the operating includes producing DHP molecules within each of the DHP generating devices and directing the DHP molecules out of the devices and into the treatment area, wherein the residence time of the DHP molecules within each of the DHP generating devices is less than 1 second,
wherein the two-stage process includes—
(i) an initial conditioning phase for conditioning the treatment area with DHP, wherein during the initial conditioning phase, at least one of the following three conditions (Ai) to (Ci) is met—
  (Ai) the relative humidity within the treatment area is at least 3% higher than the relative humidity in the treatment area measured just before the operating;
  (Bi) the levels of volatile organic compounds (VOCs) in the treatment area are lower than the level of VOCs in the treatment area just before the operating but are still measurable; and
  (Ci) the concentration of DHP within the environment is increasing or decreasing; and
(ii) a maintenance phase for maintaining an equilibrium concentration of DHP in the treatment area, wherein during the maintenance phase, at least one of the following three conditions (Aii) to (Cii) are met—
  (Aii) the relative humidity within the treatment area is approximately the same as the relative humidity in the treatment area measured just before the operating-of step (b);
  (Bii) the levels of VOCs in the treatment area are not detectable; and
  (Cii) the concentration of DHP in the treatment area is at steady-state,
wherein the steady-state equilibrium concentration of DHP in the treatment area during the maintenance phase is between 1 part per billion by weight (ppb) and 5 ppb throughout at least 90% of the volume of the treatment area of the healthcare facility, wherein the maintenance phase is maintained for at least one week, and wherein the multidrug-resistant organisms (MDROs) in the healthcare facility are reduced by at least 70% to provide a reduced level of MDROs and maintained at the reduced level of MIDROs for at least 30 days.

20. The method of claim 19, wherein the method further comprises reducing nosocomial infections by at least 25% when measured on a 3 month window.

21. The method of claim 19, wherein the healthcare facility is subject to reintroduction and contamination of multidrug-resistant organisms (MDROs) during the initial conditioning phase and/or the maintenance phase.

22. The method of claim 19, wherein the distribution of DHP in the treatment environment is throughout at least 90% of the volume of the treatment area.

23. A method for reducing the spread of infection during an acute infectious outbreak in a healthcare facility, the method comprising:
   (a) identifying at least one treatment area having an acute infection outbreak;
   (b) providing two or more Dry Hydrogen Peroxide (DHP) generating devices in the treatment area;
   (c) operating the DHP generating devices in a two-stage process to produce and distribute DHP in the treatment area, wherein the operating includes producing DHP molecules within each of the DHP generating devices and directing the DHP molecules out of the devices and into the treatment area, wherein the residence time of the DHP molecules within each of the DHP generating devices is less than 1 second,
   wherein the two-stage process includes-
      (i) an initial conditioning phase for conditioning the treatment area with DHP, wherein during the initial conditioning phase, at least one of the following three conditions (Ai) to (Ci) is met—
         (Ai) the relative humidity within the treatment area is at least 3% higher than the relative humidity in the treatment area measured just before the operating of step (c);
         (Bi) the levels of volatile organic compounds (VOCs) in the treatment area are lower than the level of VOCs in the treatment area just before the operating of step (c) but are still measurable; and
         (Ci) the concentration of DHP within the environment is increasing or decreasing; and
      (ii) a maintenance phase for maintaining an equilibrium concentration of DHP in the treatment area, wherein during the maintenance phase, at least one of the following three conditions (Aii) to (Cii) are met—
         (Aii) the relative humidity within the treatment area is approximately the same as the relative humidity in the treatment area measured just before the operating of step (c);
         (Bii) the levels of VOCs in the treatment area are not detectable; and
         (Cii) the concentration of DHP in the treatment area is at steady-state;
   wherein the steady-state equilibrium concentration of DHP in the treatment area during the maintenance phase is between 1 parts per billion by weight (ppb) and 5 ppb throughout at least 90% of the volume of the treatment area of the healthcare facility; and
   (d) maintaining the steady-state equilibrium concentration of DHP in the treatment area between 1 ppb and 5 ppb throughout at least 90% of the volume of the treatment area of the healthcare facility until the acute infectious outbreak is controlled.

24. The method of claim 23, wherein the treatment area has not been previously treated with DHP prior to the operating of (c).

25. The method of claim 24, wherein the treatment area is a DHP containing treatment area and the providing comprises providing one or more stand alone DHP generating units.

26. The method of claim 7, wherein the maintaining reduces the number of colony forming units per plate (CFU/plate) on contact plates by least 70% compared to an untreated treatment area.

27. The method of claim 1, wherein the initial conditioning phase is conducted for a time period of from about 1 day to about 1 month.

* * * * *